(12) United States Patent
Hodge et al.

(10) Patent No.: US 10,386,577 B2
(45) Date of Patent: Aug. 20, 2019

(54) OPTICAL COUPLING ASSEMBLY

(71) Applicant: Molex, LLC, Lisle, IL (US)

(72) Inventors: Malcolm H. Hodge, Chicago, IL (US);
Calob Lostutter, Bolingbrook, IL (US);
Daniel Tillotson, Wheaton, IL (US);
Eric A. Deichmann, Naperville, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/987,559

(22) Filed: May 23, 2018

(65) Prior Publication Data

US 2018/0372955 A1    Dec. 27, 2018

Related U.S. Application Data

(60) Provisional application No. 62/510,998, filed on May 25, 2017.

(51) Int. Cl.
| | |
|---|---|
| *G02B 6/36* | (2006.01) |
| *G02B 6/26* | (2006.01) |
| *G02B 6/122* | (2006.01) |
| *G02B 6/28* | (2006.01) |

(52) U.S. Cl.
CPC ............ *G02B 6/262* (2013.01); *G02B 6/122* (2013.01); *G02B 6/2817* (2013.01)

(58) Field of Classification Search
CPC ....... G02B 6/262; G02B 6/2817; G02B 6/122
See application file for complete search history.

(56) References Cited

U.S. PATENT DOCUMENTS

| | | | | |
|---|---|---|---|---|
| 5,555,331 A | * | 9/1996 | Billet | G02B 6/30 385/14 |
| 6,510,267 B1 | * | 1/2003 | Hulse | G02B 6/26 385/25 |
| 6,788,859 B1 | * | 9/2004 | Markovich | G02B 6/43 385/114 |
| 8,811,778 B2 | * | 8/2014 | Bicknell | G02B 6/43 385/14 |
| 9,028,123 B2 | * | 5/2015 | Nichol | G02B 6/0076 349/63 |
| 9,690,032 B1 | * | 6/2017 | Nichol | G02B 6/0035 |

(Continued)

*Primary Examiner* — Ellen E Kim
(74) *Attorney, Agent, or Firm* — Molex, LLC

(57) ABSTRACT

A waveguide support and reflector member is provided for optically connecting a first optical component having at least one optical waveguide including an optical axis with a second optical component. The waveguide support and reflector member includes a body having a waveguide retention section and a reflector section. The waveguide retention section is configured to support the first optical component and defines an optical plane along which each optical waveguide is disposed upon positioning the optical component at the waveguide retention section. The reflector section has an optical reflector surface aligned with the optical plane and is configured to optically connect the at least one optical waveguide with the second optical component. An optical assembly incorporating a waveguide support and reflector member and a sheet metal blank for forming a waveguide support and reflector member are also provided. An in-line waveguide support and alignment member is further provided.

12 Claims, 27 Drawing Sheets

(56) References Cited

U.S. PATENT DOCUMENTS

| | | | | |
|---|---|---|---|---|
| 10,025,043 B2* | 7/2018 | Vallance | ................ | G02B 6/124 |
| 2002/0025104 A1* | 2/2002 | Steinberg | ............. | G02B 6/3508 |
| | | | | 385/16 |
| 2011/0085771 A1* | 4/2011 | Matsuyama | ............. | G02B 6/43 |
| | | | | 385/125 |
| 2016/0274318 A1* | 9/2016 | Vallance | ................ | G02B 6/428 |
| 2017/0299824 A1* | 10/2017 | Vallance | ................ | G02B 6/422 |

\* cited by examiner

OPTICAL COUPLING ASSEMBLY

RELATED APPLICATION

This application claims priority to U.S. Provisional Application No. 62/510,998, filed May 25, 2017, which is incorporated herein by reference in its entirety.

TECHNICAL FIELD

The present disclosure relates generally to optical assemblies and, more particularly, to a waveguide support and reflector member and assembly for use in interconnecting optical components.

BACKGROUND

Optical systems may include optical components such as an opto-electronic components or photonic integrated circuits as well as a plurality of optical waveguides or fibers. In some instances, the path of the optical transmissions may require redirecting the light at an angle, such as 90°, relative to the axes of the waveguides. Existing systems for redirecting the light have typically been relatively complex, thus increasing manufacturing costs.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a waveguide support and reflector member is provided for optically connecting a first optical component having at least one optical waveguide including an optical axis with a second optical component. The waveguide support and reflector member includes a body having a waveguide retention section and a reflector section. The waveguide retention section is configured to support the first optical component and defines an optical plane along which each optical waveguide is disposed upon positioning the optical component at the waveguide retention section. The reflector section has an optical reflector surface aligned with the optical plane and is configured to optically connect the at least one optical waveguide with the second optical component.

In another aspect, a waveguide support and reflector member is provided for optically connecting a first optical component having at least one optical waveguide including an optical axis with a second optical component. The waveguide support and reflector member includes a generally planar sheet metal body having a first optical component retention section, a second optical component retention section, and a reflector section. The first optical component retention section being configured to support the first optical component adjacent the body and defines an optical plane along which each optical waveguide is disposed upon positioning the optical component at the waveguide retention section. The second optical component retention section is configured to support the second optical component adjacent the body. The reflector section has an optical reflector surface aligned with the optical plane and is configured to optically connect the at least one optical waveguide with the second optical component along a second optical path extending between the optical reflector surface and the second component retention section.

In still another aspect, an optical assembly includes a first optical component, a second optical component, and a waveguide support and reflector member. The first optical component has a plurality of waveguides with each waveguide having an optical axis. The second optical component has a plurality of optical elements with each optical element defining an element axis. The waveguide support and reflector member includes a waveguide retention section, a second optical component retention section, and a reflector section. The waveguide retention section has a length of each of the waveguides disposed thereat. The second optical component retention section includes a mounting section at which the second optical component is disposed. The reflector section is formed of metal material and has a plurality of optical reflectors. Each optical reflector is optically aligned with the optical axis of one of the waveguides and the element axis of one of the optical elements of the second optical component to define an optical path between each waveguide and an aligned optical element.

DETAILED DESCRIPTION

Figure 1:
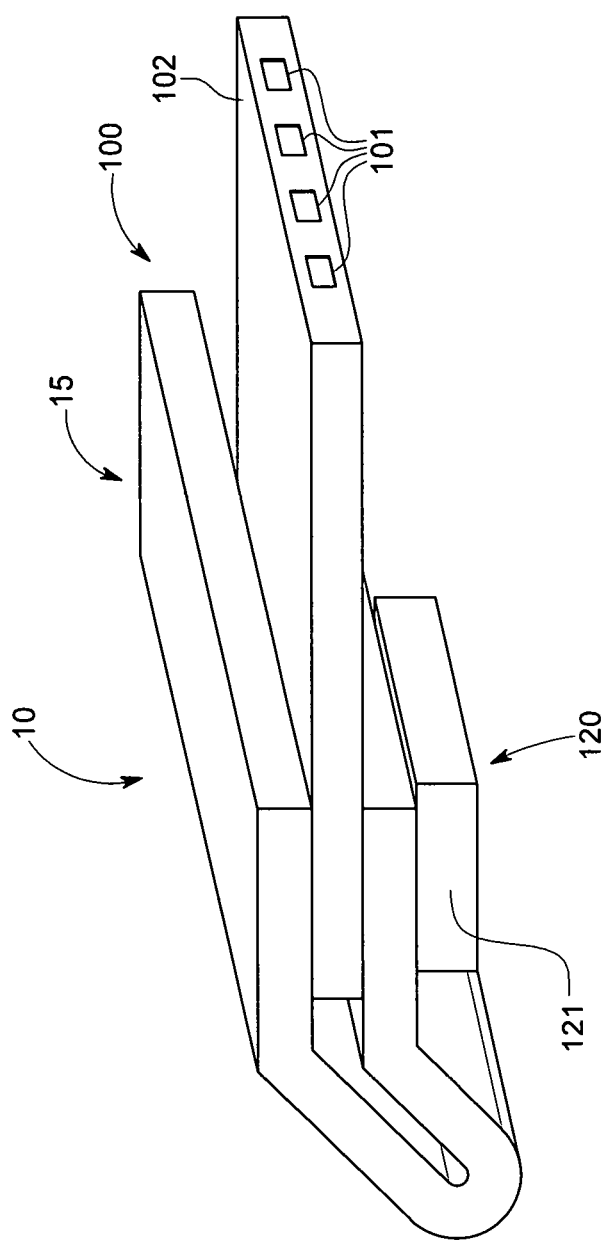
FIG. 1 is a perspective view of an optical system.
Figure 2:
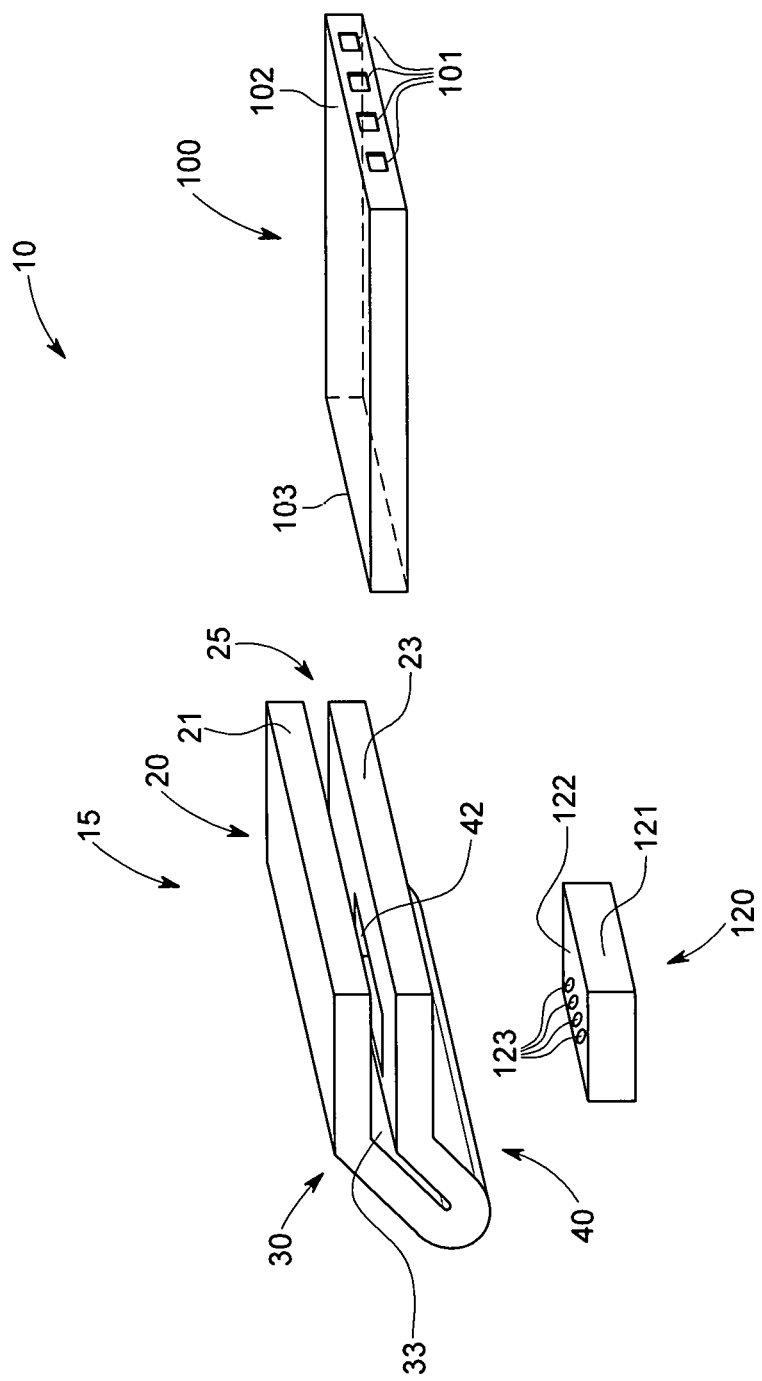
FIG. 2 is an exploded perspective view of the optical system of FIG. 1.
Figure 3:
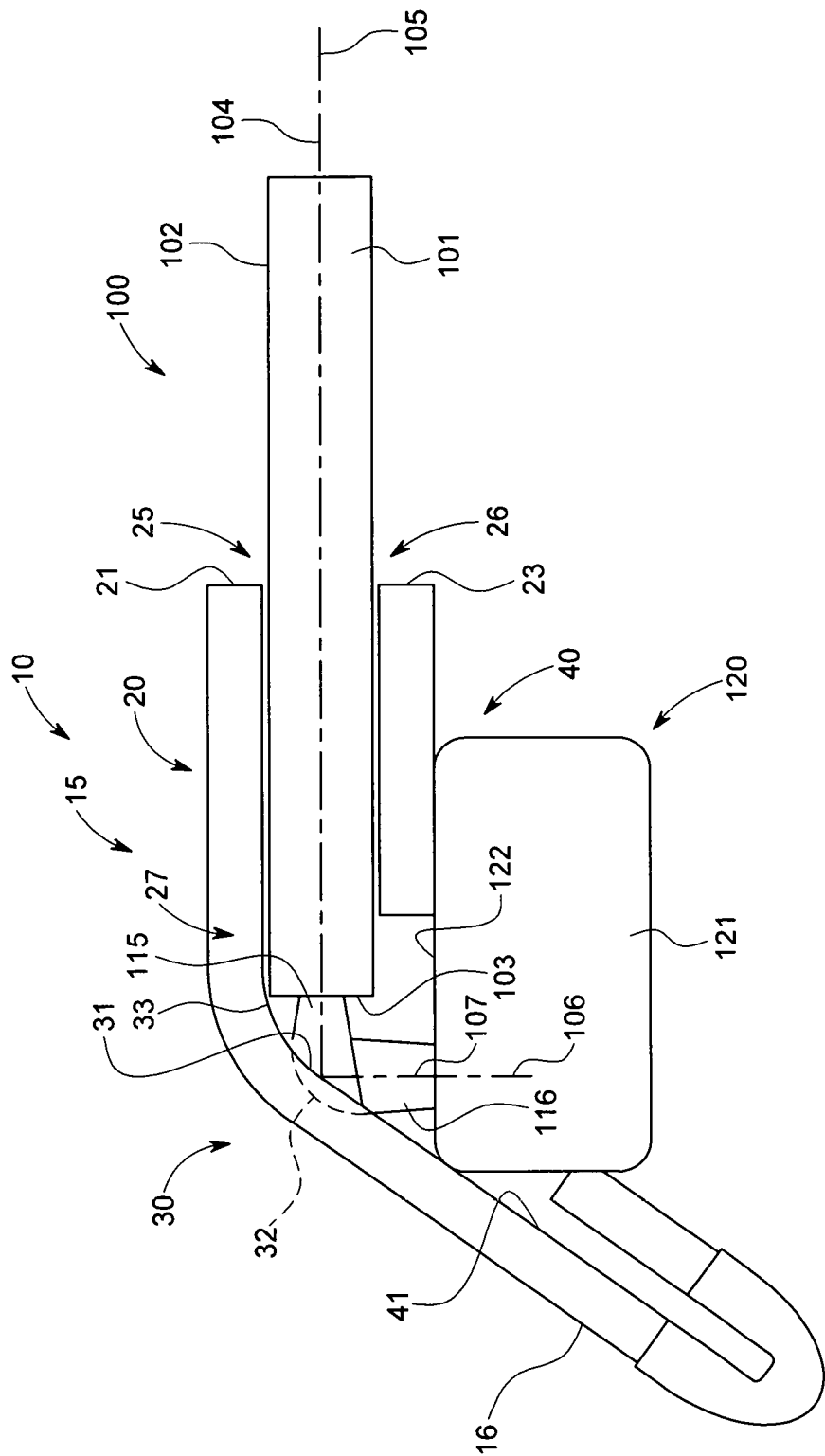
FIG. 3 is a side view of the optical system of FIG. 1.

Referring to FIGS. 1-3, an optical system 10 includes a support and reflector member 15 that supports and aligns one or more first optical components 100, such as a plurality of optical waveguides 101, and one or more second optical components 120, such as an opto-electronic component 121 or photonic integrated circuit. In one embodiment, the first optical components 100 may be configured as a polymer waveguide and comprise a plurality of parallel optical waveguides 101 supported by or within a cable 102. As depicted, the cable 102 is generally planar or flat and includes four waveguides 101. In another embodiment, the first optical component 100 may include only a single waveguide 101.

Figure 7:
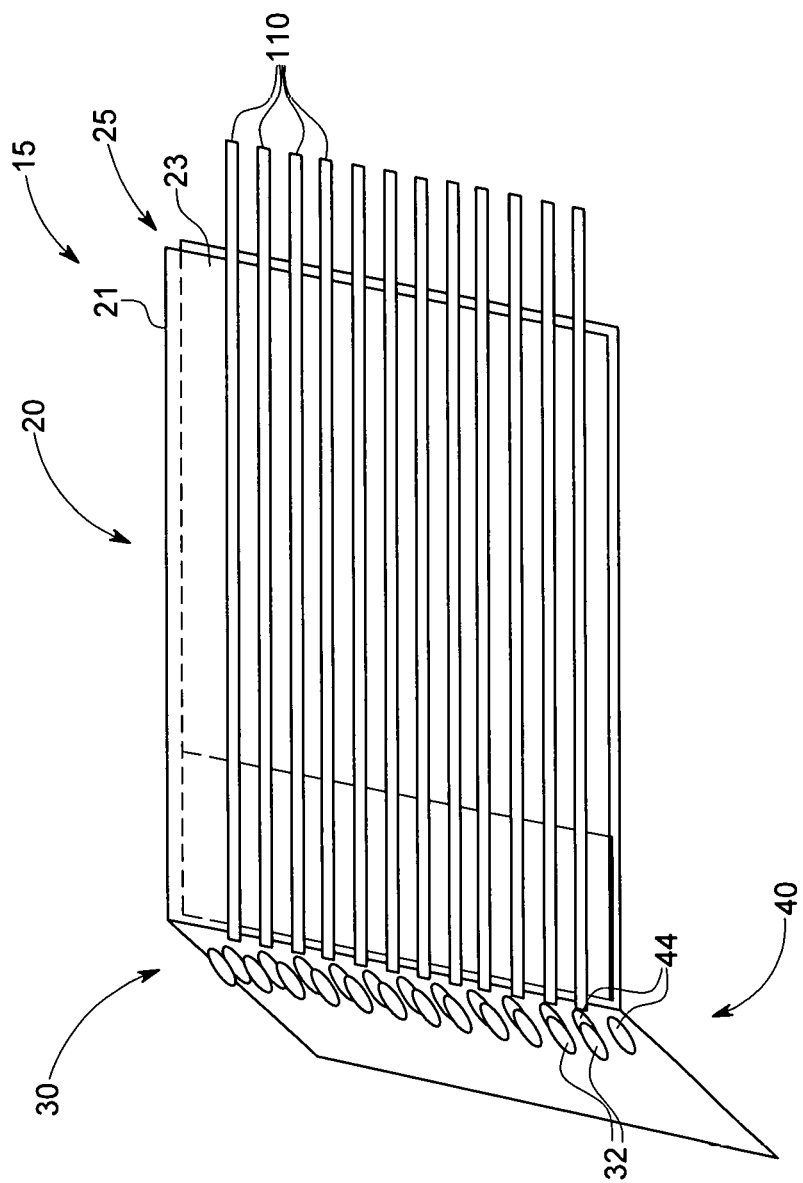
FIG. 7 is a perspective view of an optical system incorporating the alternate embodiment of the waveguide support and reflector member of FIG. 5.

In an alternate embodiment, the first optical component 100 may be configured so that each waveguide is an optical fiber 110 (FIG. 7). The optical fibers 110 may be part of a ribbon cable or a round cable, may be loose fibers, or may have any other desired configuration. In still other embodiments, the waveguides may be cross-overs, splitters, or any other component useful for transmitting optical signals. As used herein, the term "waveguide" refers to any type of optical channel including polymer waveguides formed as part of a flexible polymer cable 102, an optical fiber 110, or may have any other configuration and may be any type such as single-mode or multi-mode.

The second optical component 120 may comprise an opto-electronic component 121, such as an optical receiver, transmitter, or transceiver, a photonic integrated circuit, or any other component from which or into which light may be directed. As depicted, the second optical components 120 is an opto-electronic component 121 shaped as a cuboid with a generally planar top or upper surface 122 that includes a plurality of optical coupling elements 123 at which optical signals may enter and/or exit the opto-electronic component. The second optical component 120 may have any desired configuration and may have any number of optical coupling elements 123. In many instances, the number of optical waveguides 101 will match the number of optical coupling elements 123.

The waveguide support and reflector member 15 includes a body 16 having a first component or waveguide retention section 20, a reflector section 30 and a second component retention section 40. The waveguide retention section 20 includes an upper wall 21 and a lower wall 23 spaced from the upper wall to define a receptacle 25 configured to receive the plurality of optical waveguides 101 therein. If desired, the distance between the lower surface 22 of the upper wall 21 and the upper surface 24 of the lower wall 23 may generally match or correspond to the height or thickness of the cable 102 or, when the waveguides embody optical fibers, the diameter of the optical fibers. The receptacle 25 includes a first or insertion end 26 through which a first end 103 of the optical waveguides 101 may be inserted into the receptacle and a second or termination end 27 at which the first ends of the optical waveguides are positioned upon assembling the optical system 10.

The optical waveguides 101 are positioned within the receptacle 25 so that the optical axes 104 of the waveguide are generally parallel within the receptacle 25 or at least adjacent the termination end 27 of the receptacle 25. Together, the optical axes 104 coincide or are coincident with an optical waveguide plane 105 that extends through the receptacle 25 equidistantly positioned between the lower surface 22 of lower wall 21 and upper surface 24 of the lower wall 23. In other words, the axes 104 of the optical waveguides 101 disposed within the receptacle 25 fall on the optical waveguide plane 105.

The reflector section 30 is positioned at the termination end 27 of the receptacle 25 and includes a reflector surface 31 intersecting or aligned with the optical waveguide plane 105. The reflector surface 31 is operative to reflect light traveling along the waveguides 101. The reflector surface 31 may include a plurality of spaced apart optical reflectors 32 (FIG. 3) with each optical reflector intersecting or aligned with the axis 104 of one of the waveguides 101 disposed along the optical waveguide plane 105. In one configuration, the reflector surface 31 and/or the optical reflectors 32 may be configured to reflect light at a 45° angle relative to the optical waveguide plane 105. In other configurations, the reflector surface 31 and/or the optical reflectors 32 may be configured to reflect light at a different angle. In some configurations, the shape of the reflector surface 31 and/or the optical reflectors 32 may be based upon the configuration of the waveguides 101 and the type of signals being transmitted through the waveguides.

The optical reflectors 32 may be formed as concave indentations or recesses within the reflector section 30 so that light is reflected at a desired angle and in a desired manner. For example, in some instances, it may be desirable to focus the light in a relatively narrow manner or at a specific location. In other instances, it may be desirable to focus the light more broadly in a larger or less narrow manner. The surface of each optical reflector 32 or the reflector surface 31 in general may be plated with a highly reflective material 33 such as gold, silver, nickel, platinum, alloys of such materials, or any other desired material. In some instances, the reflector section 30 may be formed of a highly reflective material such as copper, aluminum, or alloys of such materials and the plating on the reflector surface 31 and/or optical reflectors 32 omitted.

As depicted, the reflector section 30 is generally bent or formed at a 45° angle relative to the optical waveguide plane 105 so that the reflector surface 31 and/or the optical reflectors 32 reflect light at a 45° angle. This results in the reflection of light traveling from the waveguides 101 along a second component plane 106 that intersects with both the reflector surface 31 and/or optical reflectors 32 and the second component retention section 40. Coupling axes 107 (FIG. 3) extend between the optical coupling elements 123 and the reflector surface 31 and/or their respective optical reflectors 32 in a generally parallel manner along the second component plane 106.

The optical coupling elements 123 on the upper surface 122 of the second optical component 120 are positioned so that light from the waveguides 101 reflected from the reflector surface 31 and/or each optical reflector 32 is reflected onto one of the optical coupling elements. Similarly, light from the optical coupling elements 123 reflected from the reflector surface 31 and/or each optical reflector 32 is reflected onto one of the optical waveguides 101. In other words, the reflector surface 31 and/or each optical reflector 32 operate in an equally effective manner regardless of whether light is being transmitted from the optical waveguides 101 to the optical coupling elements 123 or whether light is being transmitted from the optical coupling elements to the optical waveguides. As a result, the direction of light transmission between the optical waveguides 101 and the second optical component 120 may be reversed with the reflector surface and/or the optical reflectors 32 operating with equal effectiveness. In FIG. 3, light traveling between the first end 103 of the waveguides 101 and the reflector surface 31 is depicted at 115 and light traveling between the reflector surface 31 and the optical coupling elements 123 is depicted at 116.

Figure 4:
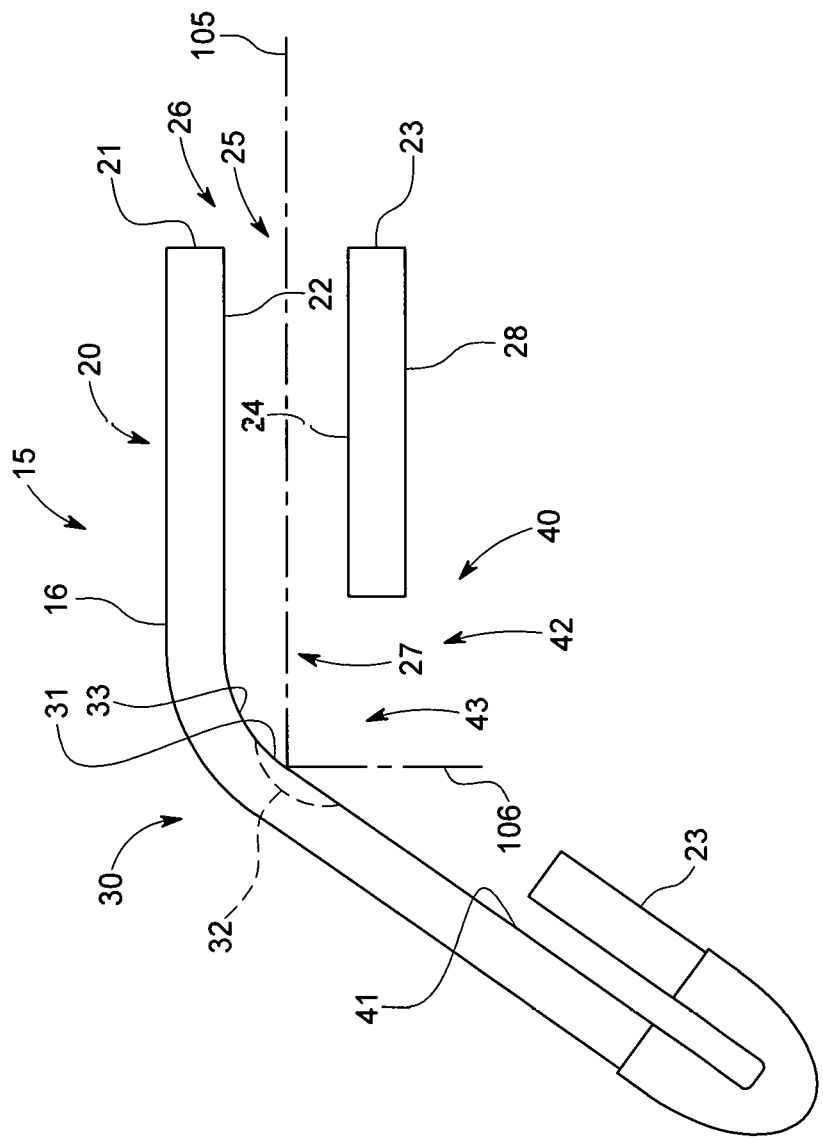
FIG. 4 is a side view of the waveguide support and reflector member of FIG. 3.

The second component retention section 40 may be positioned generally below the waveguide retention section 20 with a portion of the second component retention section vertically intersecting or aligned with the second component plane 106. The second component retention section 40 may extend along a lower surface 28 of the lower wall 23 of the waveguide retention section 20. If desired, the second component retention section 40 may include a stop surface 41 that defines a stop or end of axial movement of the second optical component 120 for use during the process of assembling the optical system 10. In some embodiments, the second component retention section 40 may include one or more openings 42 (FIG. 4) aligned with the photonic circuit plane 106 between the reflector surface 31 and/or the optical reflectors 32 and the optical coupling elements 123 of the second optical component 120. More specifically, as depicted in FIG. 4, an extension 43 of the lower wall 23 of the waveguide retention section 20 may include an opening 42 through which light may pass. The stop surface 41 may be formed as a portion of the reflector section 30 and the extension 43.

Figure 5:
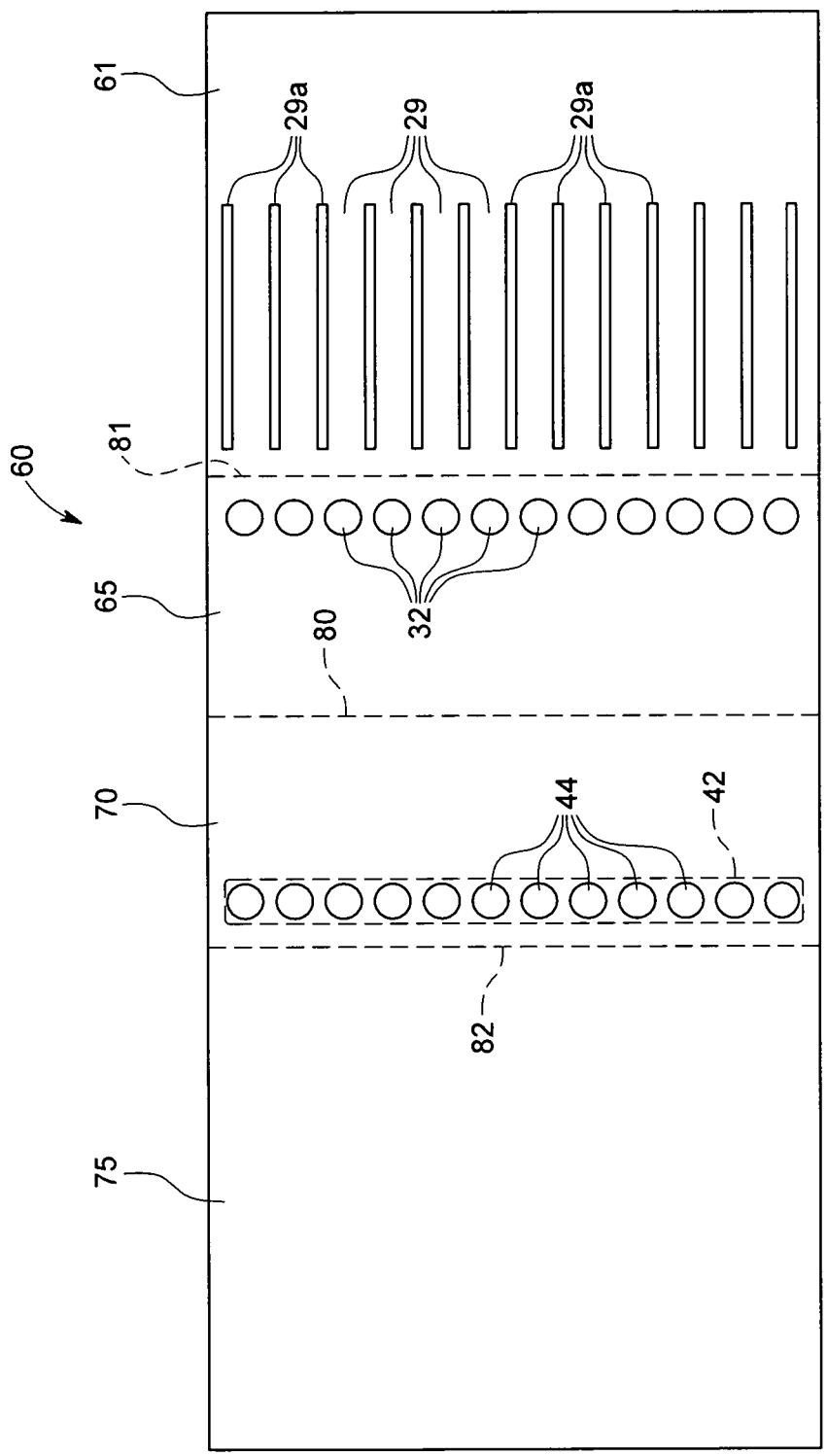
FIG. 5 is a top plan view of a blank from which an alternate embodiment of a waveguide support and reflector member is formed.

Referring to FIG. 5 in conjunction with FIGS. 1-4, in one embodiment, the waveguide support and reflector member 15 may be manufactured by forming a blank 60 of sheet-metal material into a desired configuration. The blank 60 includes, sequentially from right to left in FIG. 5, a first section 61, a second section 65, a third section 70, and a fourth section 75. The boundary between the first section 61 and the second section 65 is defined by fold line 81, the boundary between the second section 65 and the third section 70 is defined by fold line 80, and the boundary between the third section 70 and the fourth section is defined by fold line 82.

When formed, the first section 61 defines a first portion of the waveguide retention section 20 (e.g., the upper wall 21), the second section 65 defines a first portion of the reflector section 30, the third section 70 defines a second portion of the reflector section 30, and the fourth section 75 defines a second portion of the waveguide retention section 20 (e.g., the lower wall 23). The second section 65 includes the reflector section 31 and/or the plurality of optical reflectors 32 and the third section 70 includes a plurality of openings 44 through which light may pass. In other words, rather than including a single opening 42, the blank 60 in FIG. 5 and the embodiment of FIGS. 6-7 replaces the single opening 42 with a plurality of openings 44. For clarity, a single opening 42 is depicted in dotted line in FIG. 5.

The blank 60 in FIG. 5 also depicts a plurality of alignment grooves 29 along the first section 61 that, once formed, will be positioned on the lower surface 22 of the upper wall 21 of the receptacle 25. The alignment grooves 29 may be used when the waveguide support and reflector member 15 is configured to receive optical fibers 110 and function to laterally align the optical fibers relative to the optical reflectors 32. The alignment grooves 29 may be formed by projections 29a on the lower surface 22 of upper wall 21. In an alternate configuration, the alignment grooves 29 may be disposed on the upper surface 24 of the lower wall 23.

Figure 6:
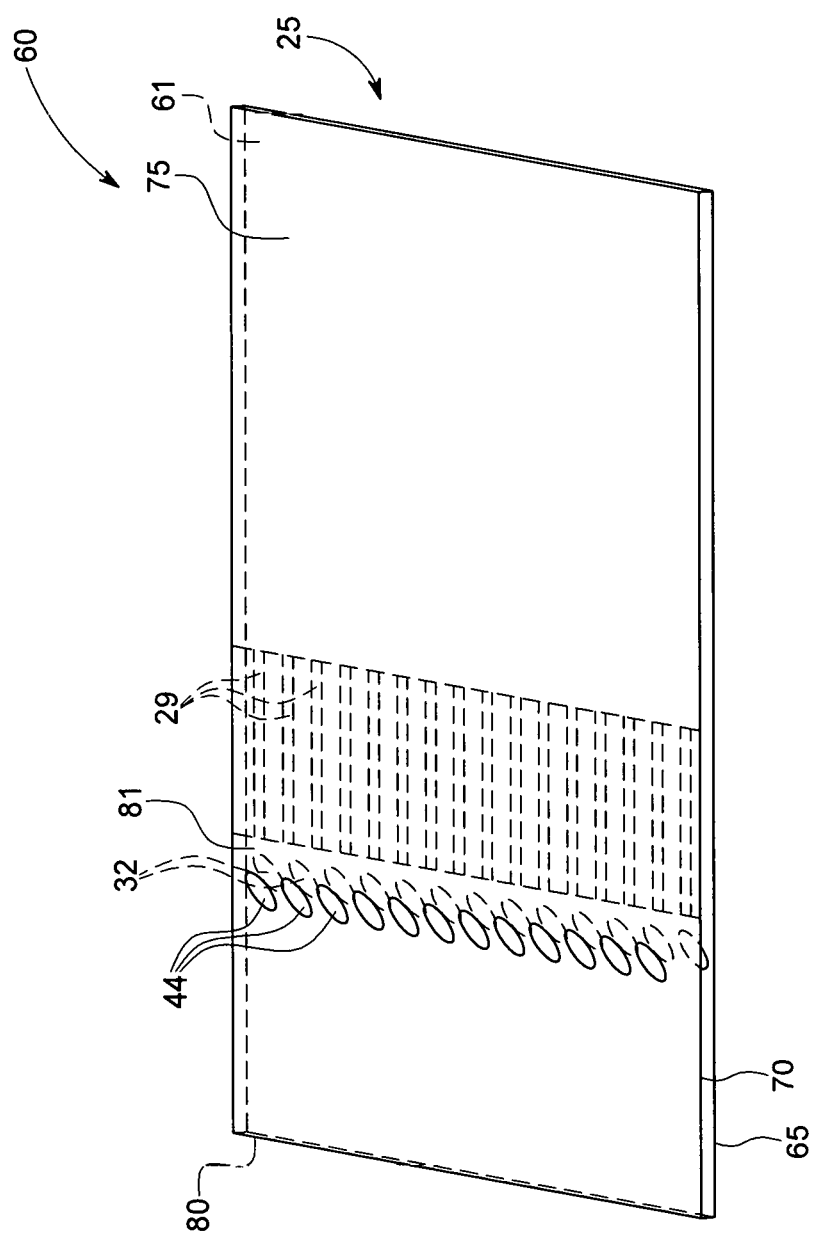
FIG. 6 is a perspective view of the blank of FIG. 5 in a partially formed state.

During the forming process, the blank 60 is bent or folded along fold line 80 so that the third section 70 is positioned adjacent the second section 65 and the fourth section 75 is positioned adjacent the first section 61 as depicted in FIG. 6. The optical reflectors 32, openings 44, and fold line 80 are positioned so that upon folding blank 60 along the fold line 80, each optical reflector 32 is aligned with one of the openings 44. In addition, after folding along fold line 80, the fold lines 81 and 82 are aligned or positioned adjacent each other. As depicted in FIG. 7, the blank 60 is then bent or folded along fold line 81 at approximately a 45° angle so that the optical reflectors 32 are positioned to reflect light between the waveguides 101 and the second optical component 120.

With such a configuration, the receptacle 25 is formed by positioning the first section 61 adjacent the fourth section 75. In order to prevent the third section 70 from obscuring or blocking light passing between the reflector surface 31 and/or the optical reflectors 32 and the optical coupling elements 123, the optical opening 42 or plurality of openings 44 are provided in the third section so that upon forming the support and reflector member 15, light may travel between the reflector surface 31 and/or the optical reflectors 32 and the optical coupling elements 123.

After bending or forming the blank 60 to form the waveguide support and reflector member 15, the waveguides 101 and the second optical component 120 may be mounted on the waveguide support and reflector member. FIG. 7 depicts the optical waveguides 101 configured as a plurality of optical fibers 110 with the plurality of optical fibers inserted into the receptacle 25 of the waveguide support and reflector member 15.

Each of the waveguides 101 and the second optical components 101, 120 may be passively or actively aligned with or relative to the reflector surface 31 and/or the optical reflectors 32. In a passive alignment configuration, the waveguide support and reflector member 15 and the waveguides 101 and the second optical component 120 may include registration or positioning members (not shown) to laterally and/or axially align the waveguides and the second optical component with the reflector surface 31 and/or the optical reflectors 32 and thus with the other optical components. In some instances, passive alignment of the optical waveguides 101 along their optical axes 104 may be achieved by inserting the optical waveguides until they stop upon reaching the bend 33 (FIG. 3) between the retention section 20 and the reflector section 30. In an active alignment process, light may be transmitted through the optical waveguides 101 and/or the second optical component 120 may be activated to transmit or receive optical signals and the components positioned to maximize light transmission and minimize signal loss.

Upon aligning the optical waveguides 101 within the receptacle 25 and the second optical component 120 at the second component retention section 40, the optical waveguides and the second optical component may be secured to the waveguide support and reflector member 15. In one embodiment, the optical waveguides 101 and the second optical component 120 may be secured to the waveguide support and reflector member 15 with an adhesive such as epoxy having a desired index of refraction. The adhesive may be positioned along the optical path between the optical waveguides 101, the optical reflectors 32, and the second optical component 120 and form a portion of the optical path between the components.

In another embodiment, the optical waveguides 101 and the second optical component 120 may be secured to the waveguide support and reflector member 15 with an adhesive such as epoxy but the adhesive may not be positioned within the optical path between the optical waveguides 101, the optical reflectors 32, and the second optical component 120. In such case, an optical coupling fluid or material, such as an optical coupling gel or grease, having a desired index of refraction may be positioned between the optical waveguides 101, the optical reflectors 32, and the second optical component 120 to form a portion of the optical path between the components and improve the optical transmission characteristics of the system.

In some instances, the index of refraction of the adhesive or optical coupling fluid or material, such as gel or grease, may match that of any of the optical waveguides 101 or the second optical component 120, or may have some other desired value such as between the indices of refraction of the optical waveguides and the second optical component.

By providing an optically matched adhesive or optical coupling fluid or material along the optical path, the reflector surface 31 and/or optical reflectors 32 will be protected against dirt, debris, and oxidation regardless of the material from which the reflector surface or optical reflectors are formed. For example, if the reflector surface 31 or optical reflectors 32 are formed of a material that may oxidize or the reflective properties of the material may otherwise degrade, the application of adhesive or coupling fluid or material to the reflective surface will prevent such oxidation or degradation.

As stated above, the blank 60 may be formed of sheet-metal material. The sheet metal may be reflective such as copper, a copper alloy, aluminum or some other desired material. If the sheet metal is not reflective, a desired reflective material may be plated or otherwise applied to the reflector surface 31 and/or the optical reflectors 32. While the waveguide support and reflector member 15 is depicted as being unitarily formed of a one-piece member, the waveguide retention section 20 and/or the second component retention section 40 may be formed separately from the reflector section 30 and fixed or secured together to form the waveguide support and reflector member 15.

A plurality of alternate embodiments or features are contemplated. For example, as described above, rather than including a single opening 42, a plurality of openings 44 may be provided or disposed along the extension 43 of the lower wall 23 of the waveguide retention section 20 and aligned with each of the optical reflectors 32 so that light may pass between the optical reflectors and the second optical component 120. Further, the cable 102 including the plurality of waveguides 101 may be replaced with a plurality of optical fibers 110 as depicted in FIG. 7. In such case, the use of alignment grooves 29 may be desirable.

Figure 8:
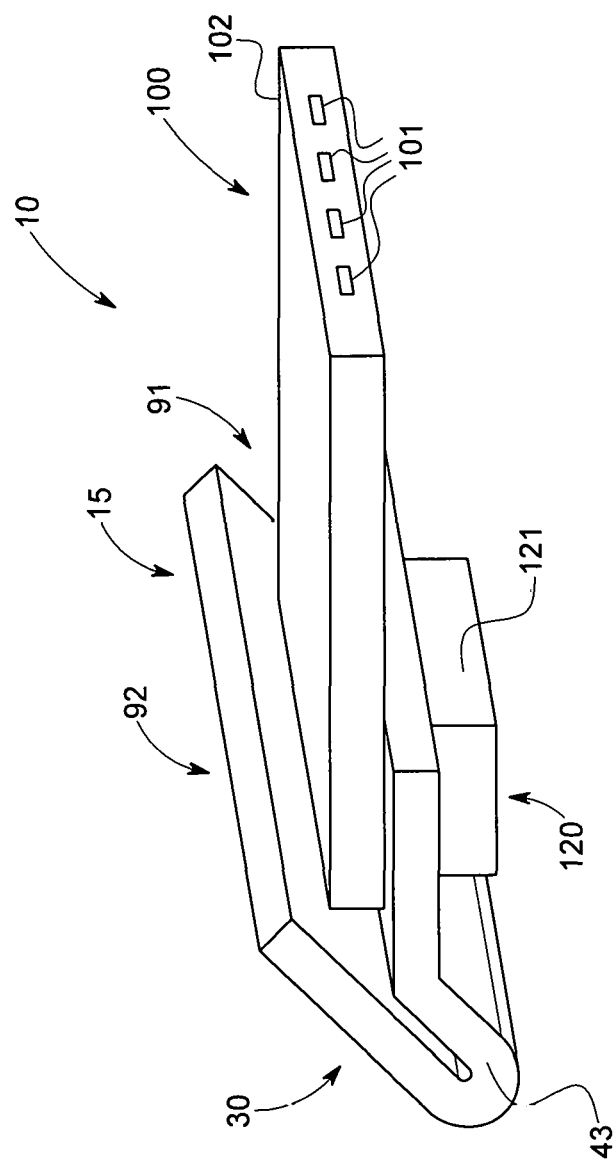
FIG. 8 is a perspective view of another alternate embodiment of an optical system.
Figure 9:
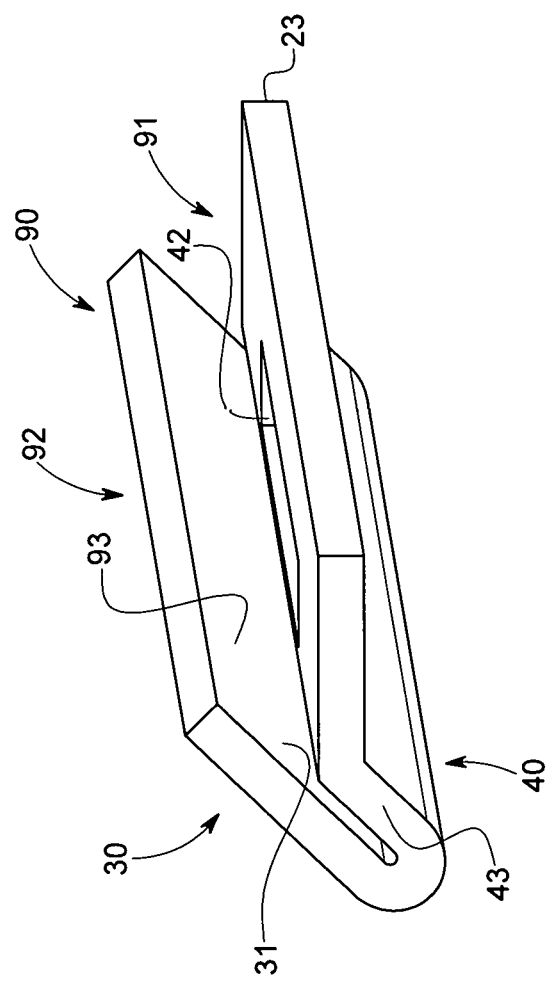
FIG. 9 is a perspective view of the waveguide support and reflector member of FIG. 8.

In another embodiment, a waveguide support and reflector member 90 may be formed with a modified waveguide retention section 91. The waveguide support and reflector member 90 depicted in FIGS. 8-9 is similar in construction to the waveguide support and reflector member 15 discussed above and some of the similar features and components will not be discussed again herein for purposes of brevity as a person of skill in the art would appreciate that the same features and components may provide the same benefits and functionality. Such similar features and components may be identified by like reference numbers.

In the waveguide support and reflector member 90, the lower wall 23 defines the waveguide retention section 91 and functions to support optical waveguides 101 and the cable 102. The reflector section 30 includes a linear extension section 92 that extends upward and may provide a stop surface 93 to limit axial travel of the waveguides 101 and cable 102. If desired, a separate cover (not shown) may be positioned over the waveguides 101 and cable 102 at the waveguide retention section 91.

Figure 10:
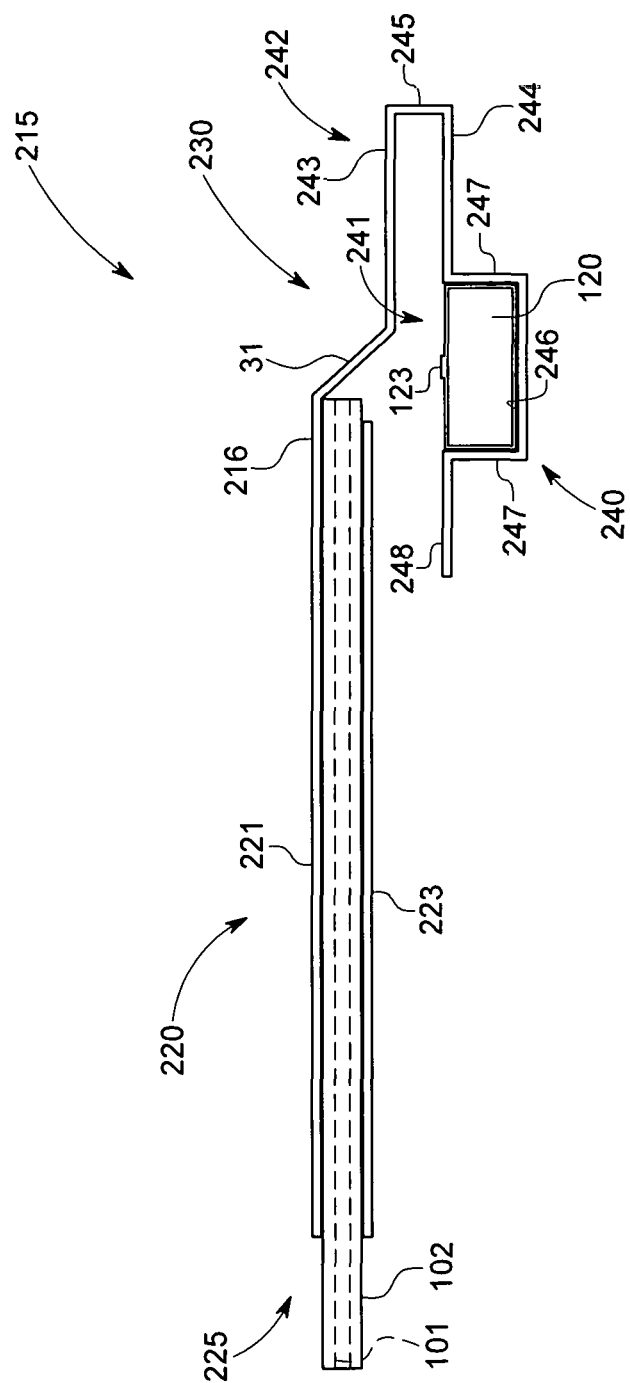
FIG. 10 is a side view of still another alternate embodiment of an optical system.
Figure 11:
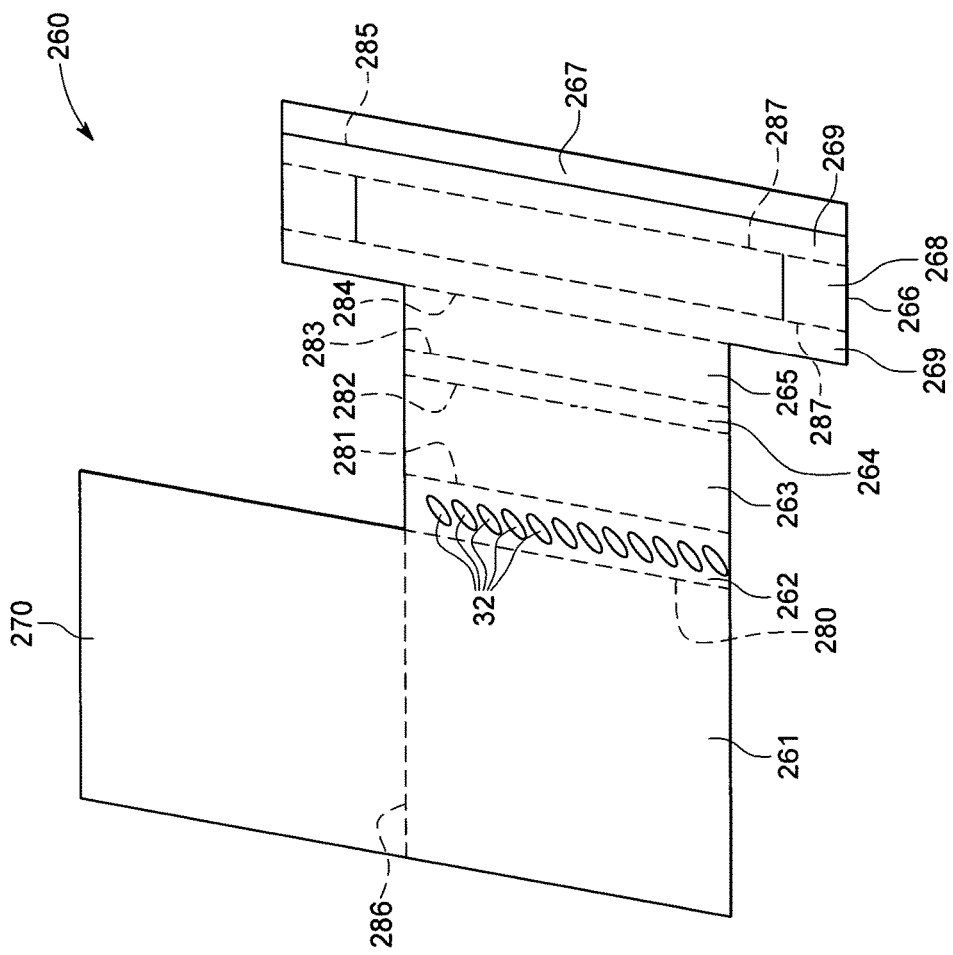
FIG. 11 is a perspective view of a blank from which the waveguide support and reflector member of FIG. 10 is formed.
Figure 12:
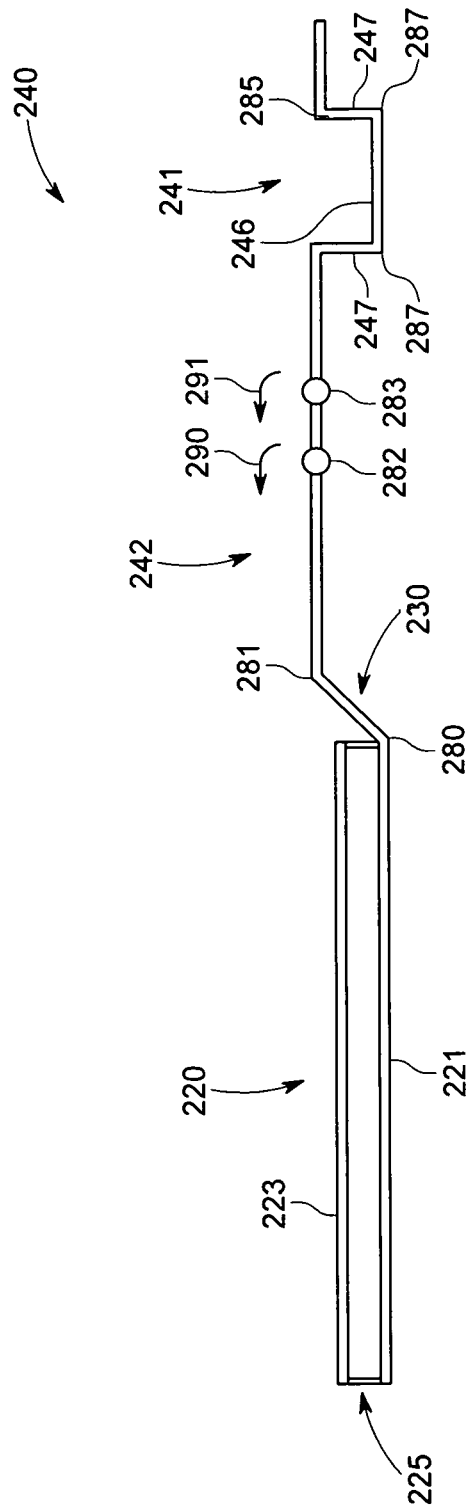
FIG. 12 is side view of the waveguide support and reflector member of FIG. 10 in a partially formed condition.

Referring to FIGS. 10-12, an alternate configuration of a waveguide support and reflector member 215 is depicted. The waveguide support and reflector member 215 is similar in construction to the waveguide support and reflector member 15 discussed above and some of the similar features and components will not be discussed again herein for purposes of brevity as a person of skill in the art would appreciate that the same features and components may provide the same benefits and functionality. Such similar features and components may be identified by like reference numbers.

Waveguide support and reflector member 215 includes a body 216 having a first component or waveguide retention section 220, a reflector section 230, and a second component retention section 240. The waveguide retention section 220 includes an upper wall 221 and a lower wall 223 spaced from the upper wall to define a receptacle 225 configured to receive a plurality of optical waveguides 101 and cable 102 therein. The receptacle 225 may be substantially identical to the receptacle 25 of the waveguide support and reflector member 15. However, the lower wall 223 is defined by section 270 that extends laterally, as depicted in FIG. 11, from section 261 that defines the upper wall 221.

The reflector section 230 may be identical or substantially identical to the reflector section 30 of the waveguide support and reflector member 15.

The second component retention section 240 includes a receptacle 241 in which the second optical component 120 is positioned or disposed. The receptacle 241 includes a generally flat floor or bottom surface 246 and spaced apart sidewalls 247. An alignment section 242 interconnects the reflector section 230 with the receptacle 241. The alignment section 242 may have any configuration that positions the receptacle 241 as desired with the optical coupling elements 123 of the second optical component 120 aligned with the reflector surface 31 and/or optical reflectors 32 of the reflector section 230. As depicted, the alignment section 242 includes a first leg 243, a second leg 244 spaced from the first leg, and a bight or bend section 245 that interconnects the first leg and the second leg. The first and second legs 243, 244 extend generally parallel to the optical waveguides 101. If desired, the second component retention section 240 may also include an arm 248 extending from one edge of the receptacle 241.

Referring to FIG. 11 in conjunction with FIG. 10, in one embodiment, the waveguide support and reflector member 215 may be manufactured by forming a blank 260 of sheet-metal material into a desired configuration. The blank includes, sequentially from left to right in FIG. 11, a first section 261, a second section 262, a third section 263, a fourth section 264, a fifth section 265, and a sixth section 266. The boundary between the first section 261 and the second section 262 is defined by fold line 280, the boundary between the second section 262 and the third section 263 is defined by fold line 281, the boundary between the third section 263 and the fourth section 264 is defined by fold line 282, the boundary between the fourth section 264 and the fifth section 265 is defined by fold line 283, and the boundary between the fifth section 265 and the sixth section 266 is defined by fold line 284. A seventh section 270 extends laterally from the first section 261 (perpendicular to axes 104) with the boundary between the first and seventh sections defined by fold line 286. If desired, an eighth section 267 may extend from the sixth section 266 with the boundary between the sixth section and the eighth section defined by fold line 285.

When formed, the first section 261 defines a first portion of the waveguide retention section 220 (e.g., the upper wall 221), the second section 262 defines the reflector section 230, the third section 263, the fourth section 264, and the fifth section 265 define the alignment section 242 of the second component retention section 240, and the sixth section 266 defines the receptacle 241 of the second component retention section 240. The seventh section 270 defines a second portion of the waveguide retention section 220 (e.g., the lower wall 223). The eighth section 267 defines the arm 248 extending from the receptacle 241.

Referring to FIG. 12, in one manufacturing process, the sixth section 266 of blank 260 is bent or folded along additional fold lines 287 so that the center portion 268 of the sixth section forms the flat floor or bottom surface 246 of the receptacle 241 and the side portions 269 of the sixth section form the sidewalls 247 of the receptacle. The eighth section 267 may be bent or folded along fold line 285 to form the arm 248 extending from the receptacle 241.

The blank 260 may also be bent or folded along fold line 280 at a desired angle such as approximately 45° so that the reflector section 31 and/or optical reflectors 32 of the reflector section 230 are positioned to reflect light in the desired direction or orientation. The blank 260 is also bent or folded along fold line 281 at a desired angle such as approximately 45° so that the alignment section 242 is generally parallel to the plane of the first section 261. The seventh section 267 is bent or folded along fold line 286 so that the seventh section is disposed or positioned adjacent the first section 261 to form the receptacle 225 of the waveguide retention section 220.

The second optical component 120 can then be inserted into the receptacle 241 and the blank 260 bent or folded along fold lines 282 and 283 to form the alignment section 242 and align the second optical component 120 with the reflector surface 31 and/or optical reflectors 32. If desired, alignment members or structure may be provided on the second optical component 120 and the receptacle 241 to assist in passive alignment of the second optical component relative to the receptacle. The fold lines 282 and 283 are depicted as circles in FIG. 12. The direction of bending or folding along fold line 282 is depicted by arrow 290 and the direction of bending or folding along fold line 283 is depicted by arrow 291.

The optical waveguides 101 may be mounted on the waveguide support and reflector member 215, aligned with the reflector surface 31 and/or optical reflectors 32, and secured to the waveguide support and reflector member in a manner similar to that described above with respect to the waveguide support and reflector member 15. As with the waveguide support and reflector member 15 described above, alignment channels may be provided along the receptacle 225 when optical fibers 110 are used to assist in aligning the individual optical fibers with the reflector surface 31 and/or the optical reflectors 32.

Figure 13:
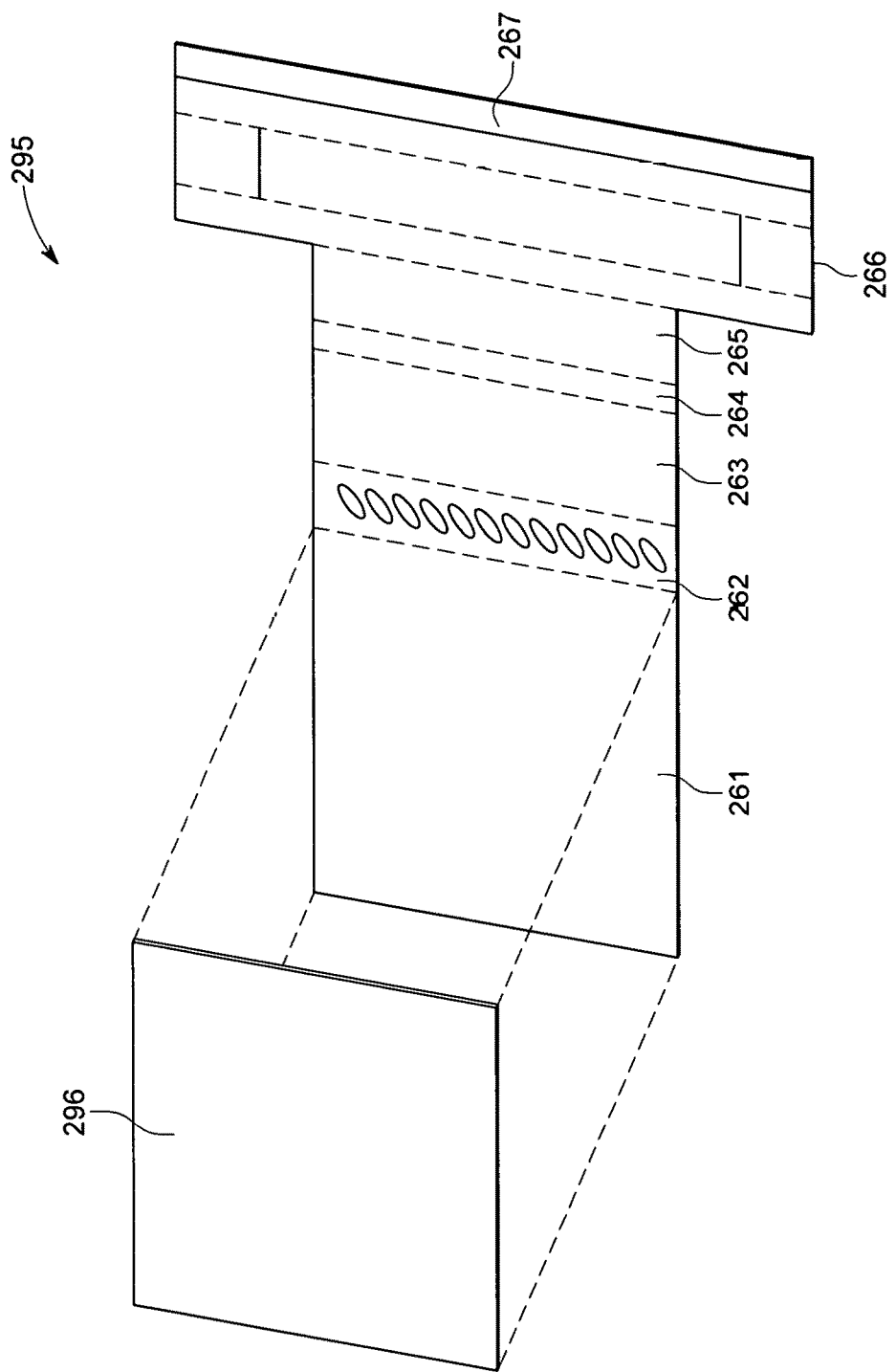
FIG. 13 is a perspective view of a blank for forming a further embodiment of a waveguide support and reflector member together with an associated hold-down member.
Figure 14:
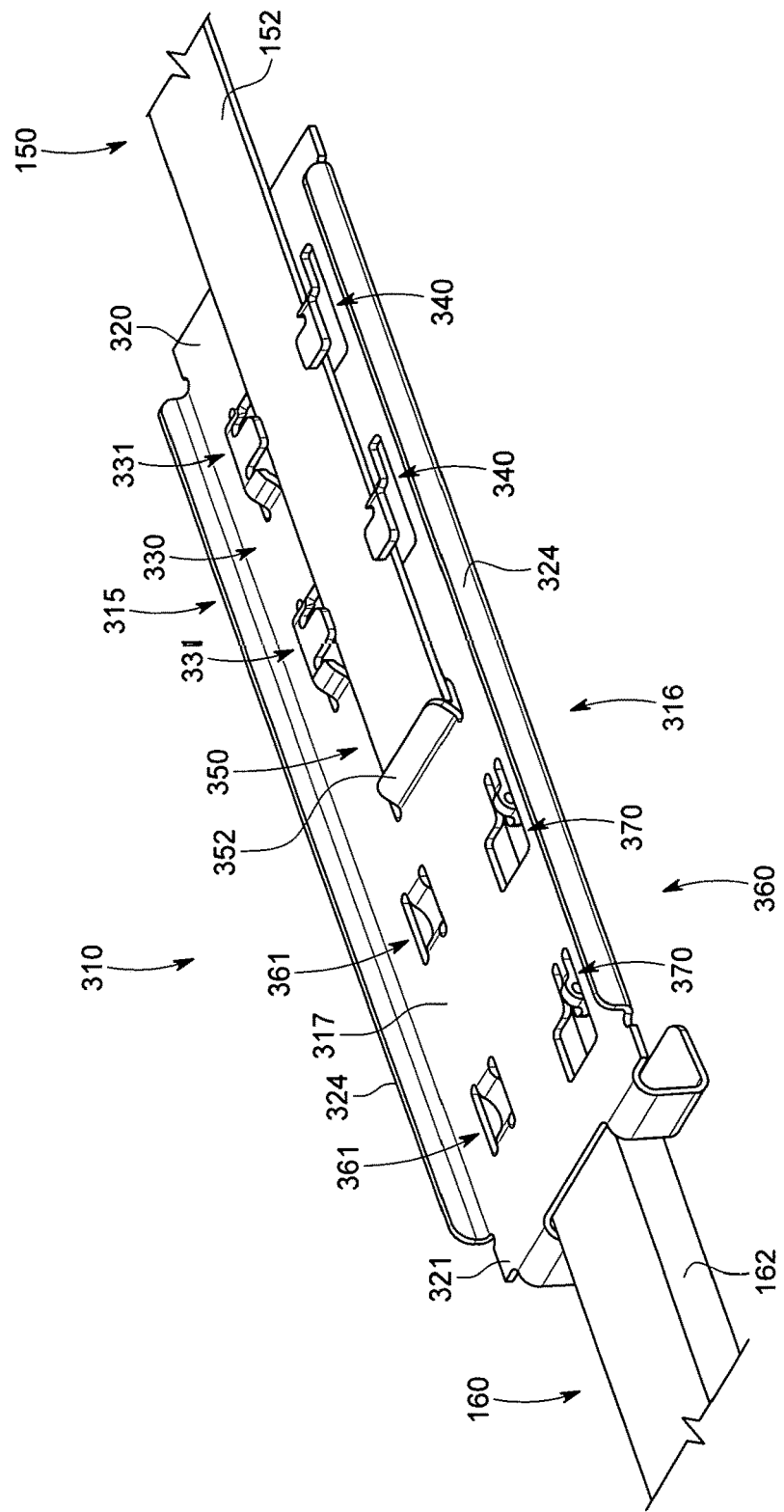
FIG. 14 is a perspective view of an alternate embodiment of an optical system.

In still another embodiment of a waveguide support and reflector member 295 depicted in FIG. 13, the seventh section 270 that forms the lower wall 223 of the receptacle 225 of the waveguide support and reflector member 215 may be omitted and replaced with a secondary component such as a separate hold-down cover 296. In such case, the optical waveguides 101 of cable 102 may be positioned on the lower surface 222 of the upper wall 221 and aligned with the reflector surface 31 and/or the optical reflectors 32. The optical waveguides 101 may then be secured to the lower surface 222 and the hold-down cover 296 secured to the waveguide support and reflector member 295 and over the optical waveguides.

Referring to FIGS. 14-25, an alternate embodiment of an optical system 310 includes a waveguide support and reflector member 315 that supports and aligns a first optical component 150 and a second optical component 160. The first and second optical components 150, 160 may be similar to the first and second optical components 100, 120 described above and certain features and components of the first and second optical components 150, 160 are not further described herein for purposes of brevity as a person of skill in the art would appreciate that the same features and components may provide the same or similar benefits and functionality.

As depicted, the first optical component 150 comprises a plurality of parallel optical waveguides 151 supported by or within a cable 152. The cable 152 is generally planar or flat with first and second side edges 153, 154, a mating end 155, an upper surface 156, a lower surface 157 opposite the upper surface, and three waveguides 151 that extend therethrough. Other configurations of the first optical component 150 and the waveguides 151 thereof are contemplated.

The second optical component 160 may comprise an opto-electronic component 161, such as an optical receiver, transmitter, or transceiver, a photonic integrated circuit, or any other component from which or into which light may be directed. As depicted, the second optical component 160 includes an opto-electronic component that forms a portion of a circuit board or member 162 and has first and second side edges 163, 164, a mating end 165, an upper surface 166 (as viewed in FIG. 15), and a lower surface 167 opposite the upper surface. A plurality of optical coupling elements 168 are disposed at the upper surface 166 and through which optical signals may enter and/or exit the opto-electronic component 161. The second optical component 160 may have any desired configuration and may have any number of optical coupling elements 168. As depicted, the number of optical waveguides 151 of the first optical component 150 matches the number of optical coupling elements 168 of the second optical component 160.

The waveguide support and reflector member 315 includes a body 316 with a first component or waveguide alignment and retention section 330, a central section 350, and a second component alignment and retention section 360. The body 316 is generally planar and includes oppositely facing first and second surfaces 317, 318, a first end 320, a second opposite end 321, and first and second sidewalls 322, 323 extending between the first and second ends. A stiffening rail 324 may extend along all or a portion of each sidewall 322, 323 to increase the rigidity of the body 316. As depicted, the first optical component 150 is positioned along the first surface 317 and the second optical component 160 is positioned along the second surface 318.

Figure 17:
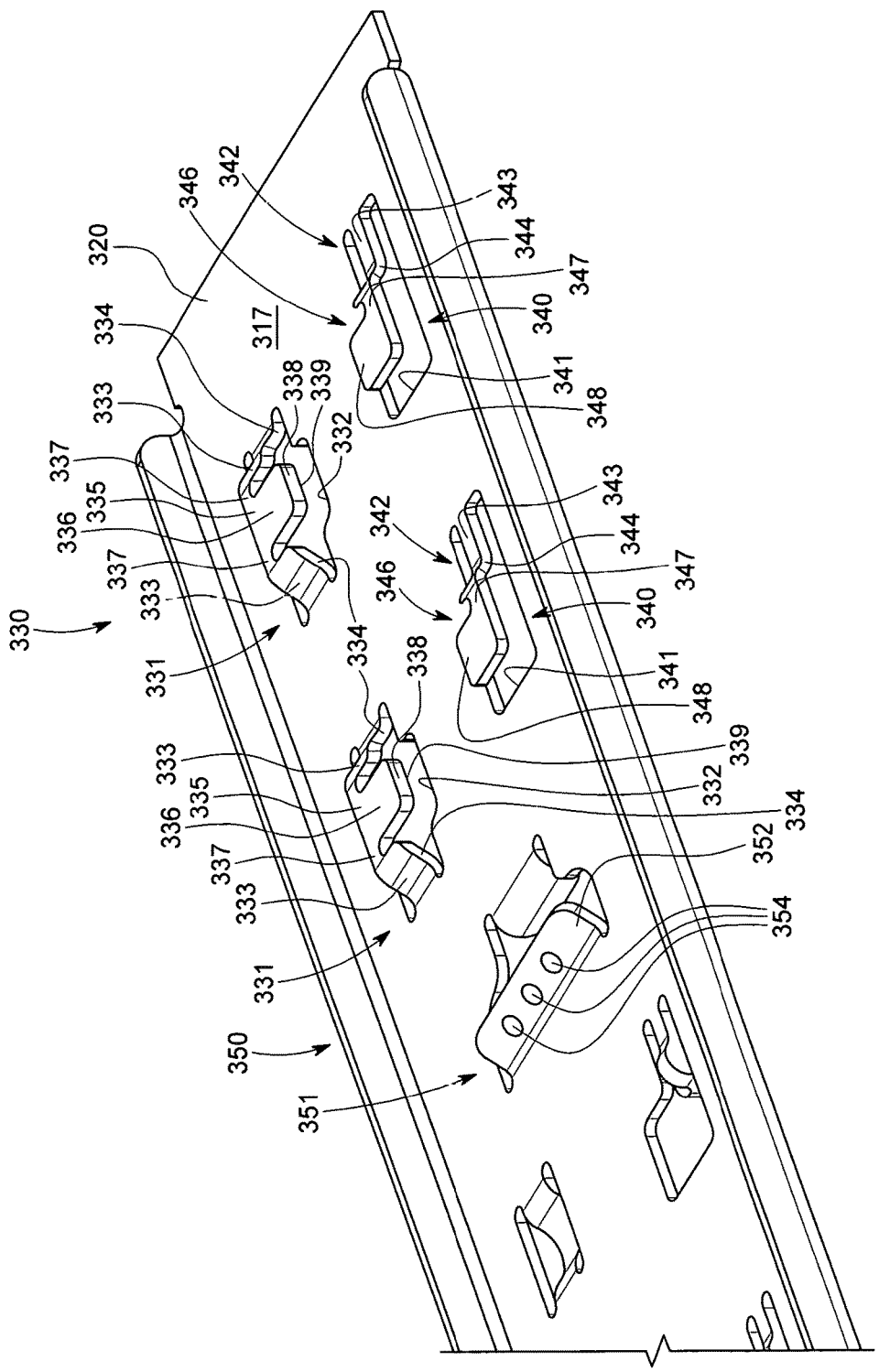
FIG. 17 is an enlarged fragmented view of the waveguide support and reflector member of FIG. 14.
Figure 18:
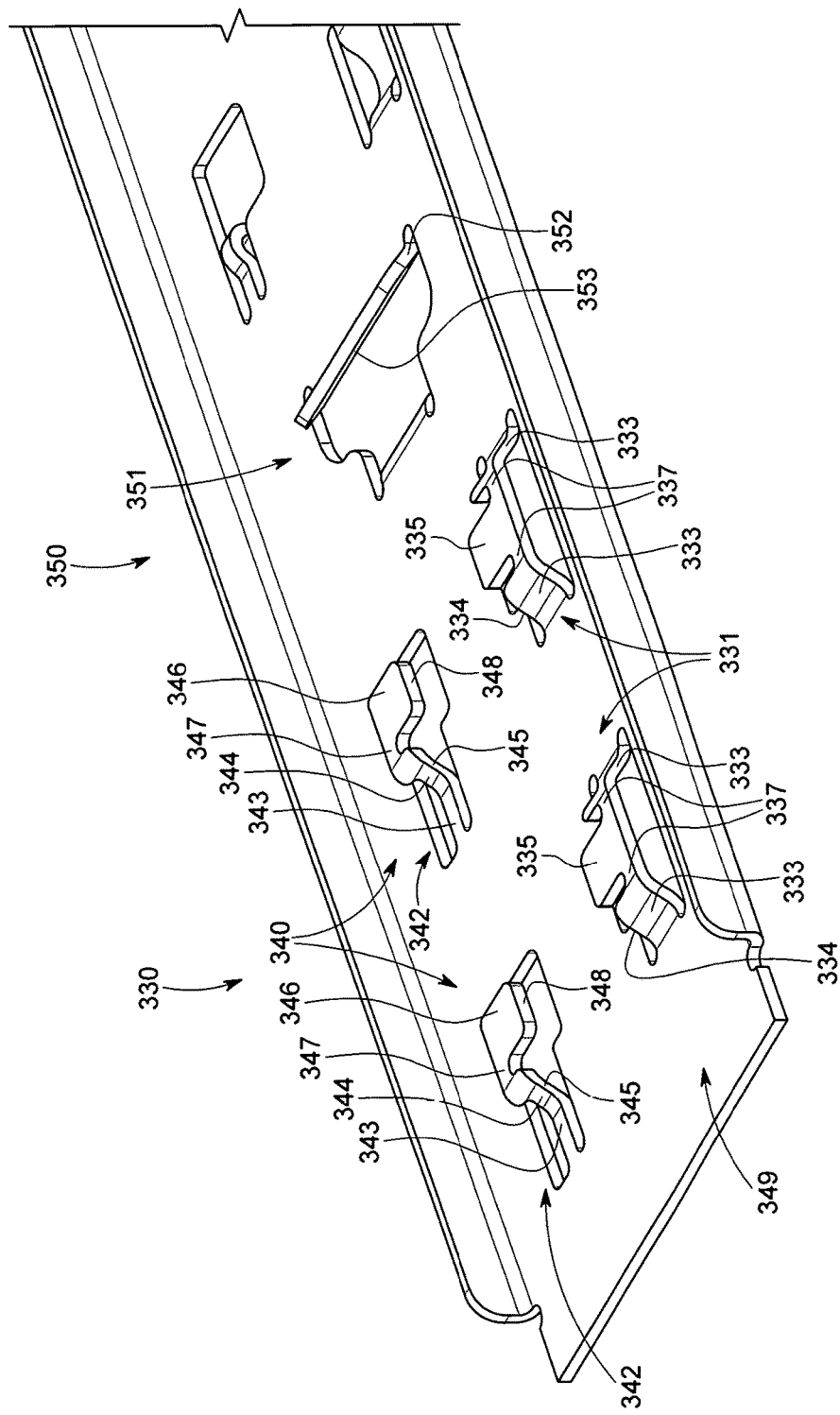
FIG. 18 is a view of the fragment of the waveguide support and reflector member of FIG. 17 but rotated by 180°.
Figure 19:
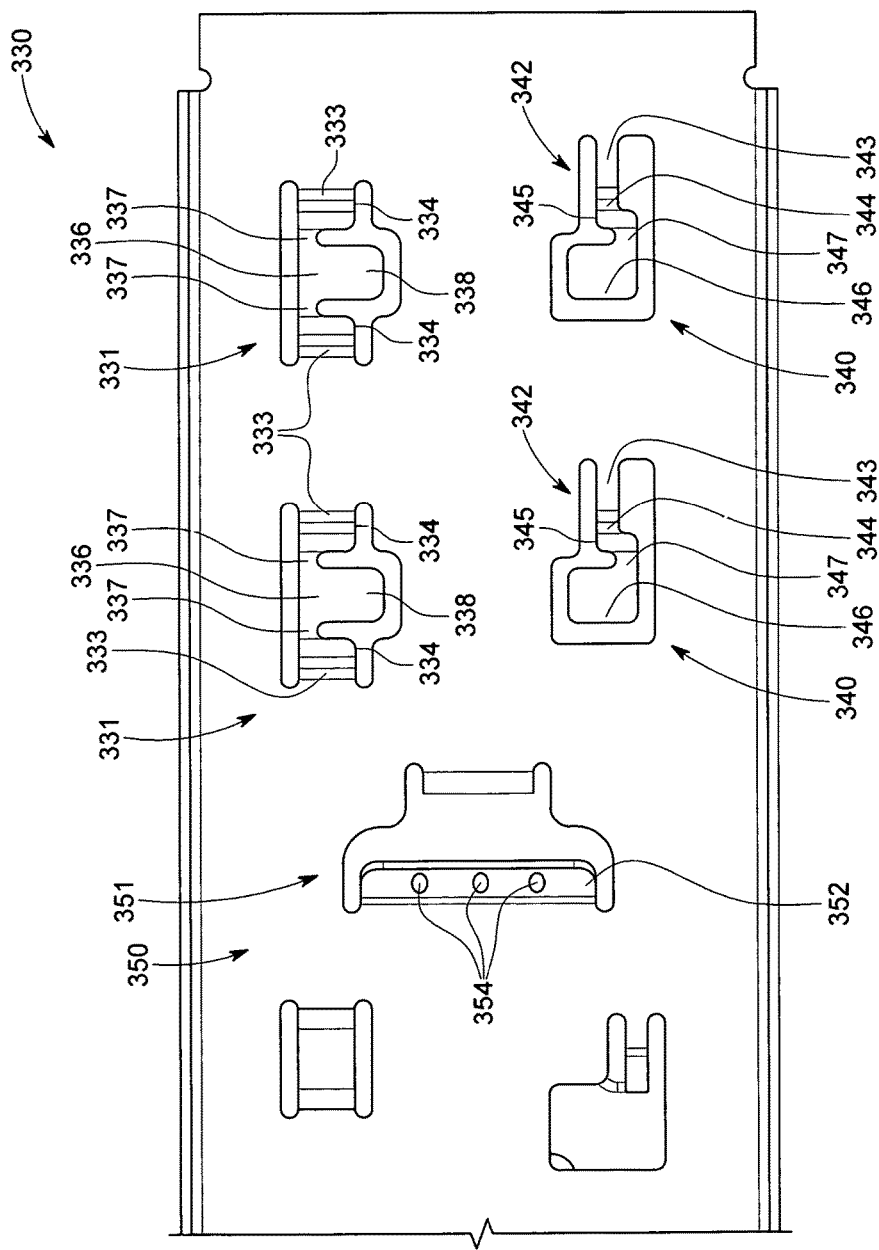
FIG. 19 is a top plan view of the fragment of the waveguide support and reflector member of FIG. 17.
Figure 20:
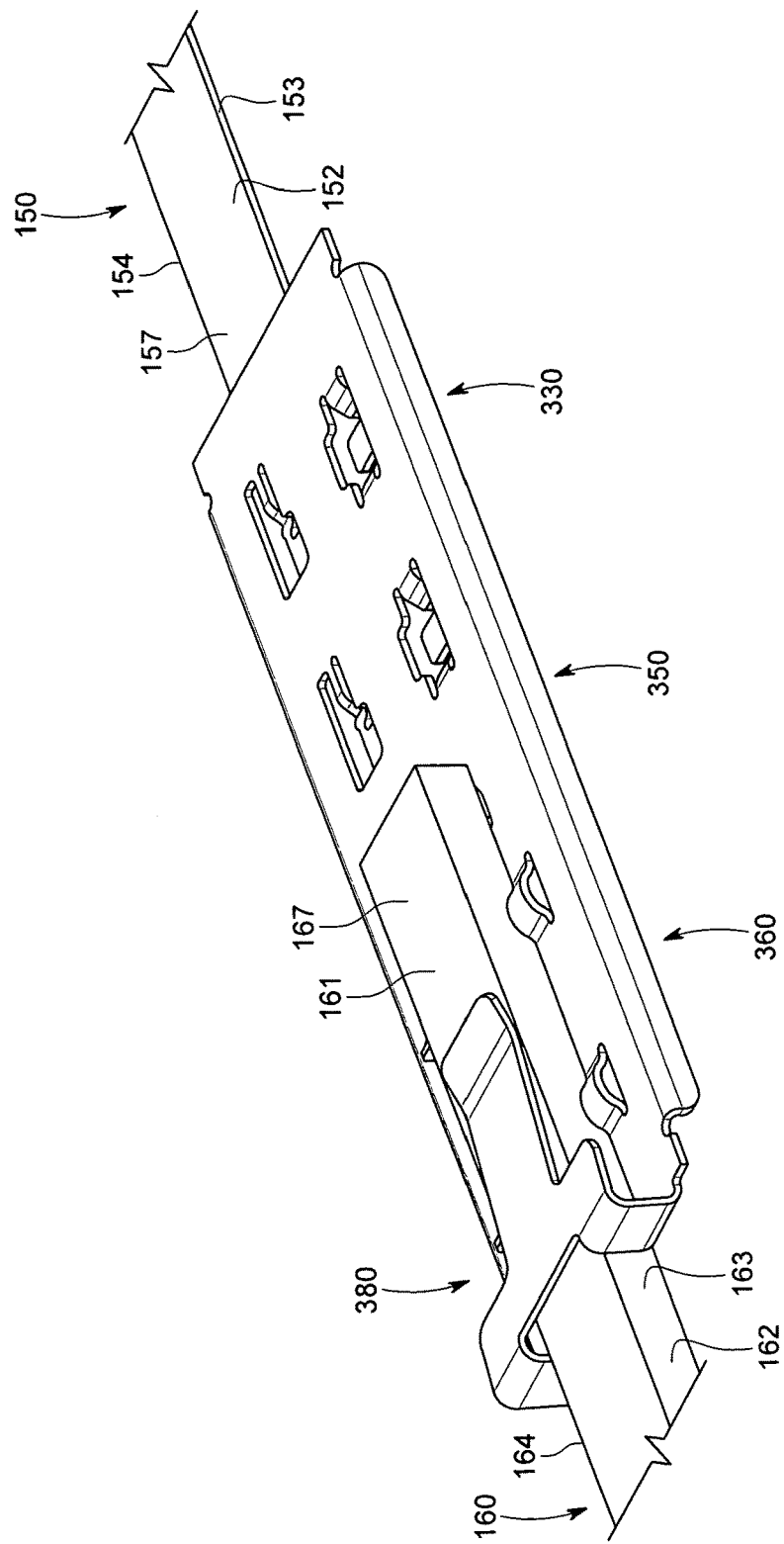
FIG. 20 is a perspective view of the optical system of FIG. 14 but depicting the opposite side of the optical system.
Figure 21:
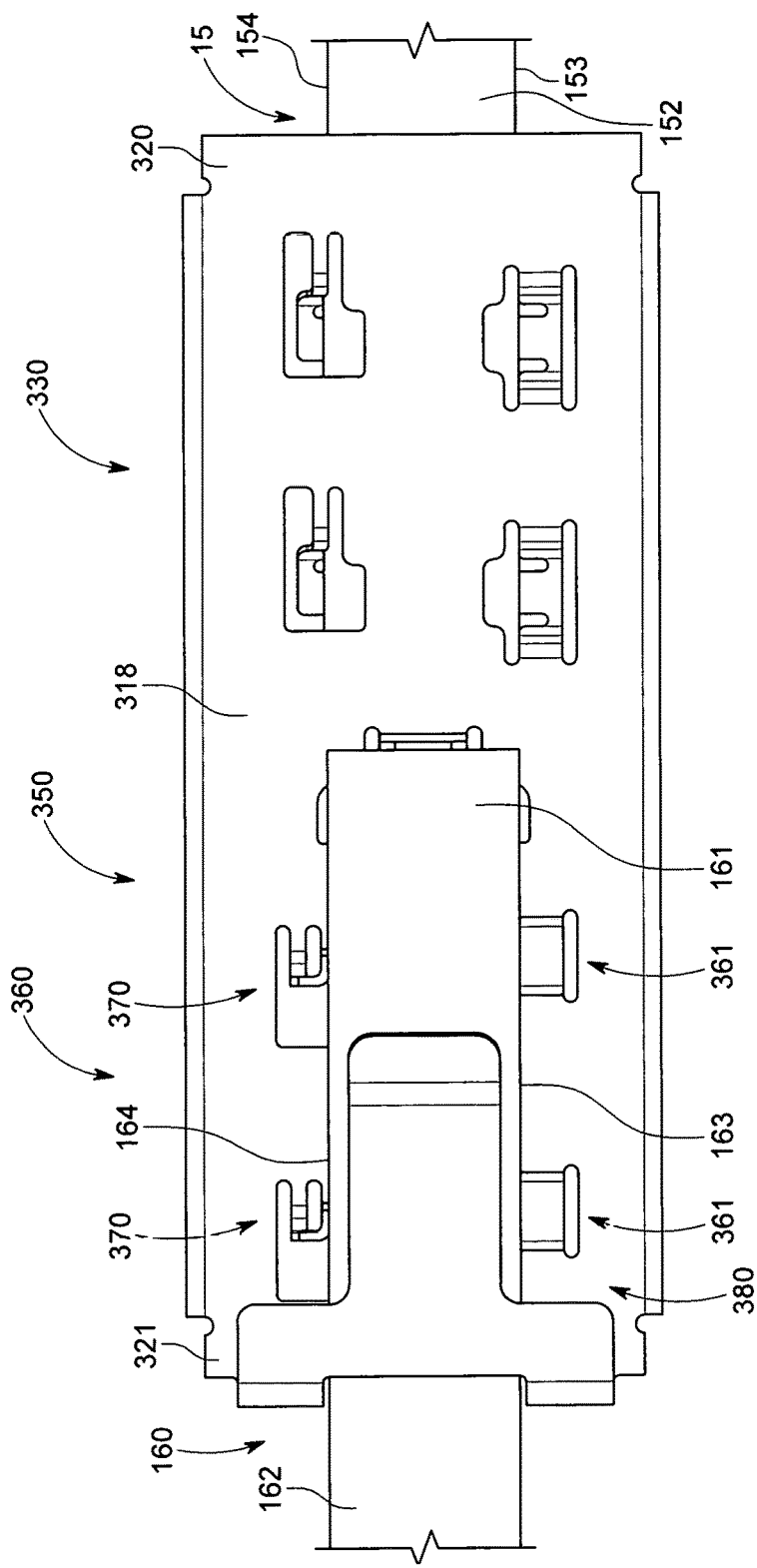
FIG. 21 is a plan view of the optical system of FIG. 20.

The waveguide alignment and retention section 330 is generally operatively positioned along the first surface 317 so that the first optical component 150 may be aligned and retained along the first surface. Referring to FIGS. 17-19, a pair of spaced apart holddown and datum members 331 are laterally positioned between the first sidewall 322 and the longitudinal centerline 325 of the body 316 and longitudinally positioned between the first end 320 and the transverse or lateral centerline 326 of the body. A pair of spaced apart holddown and biasing members 340 are laterally positioned between the second sidewall 323 and the longitudinal centerline 325 of the body 316 and longitudinally positioned between the first end 320 and the lateral centerline 326 of the body.

Each holddown and datum member 331 is generally U-shaped (in a vertical direction of the body) and integrally formed from the body 316. As such, the body 316 includes an opening 332 aligned with each holddown and datum member 331. Each holddown and datum member 331 includes a pair of generally vertical legs 333 that extend away from the first surface 317 and a generally horizontal central retention section 335 that interconnects the legs. Inasmuch as each leg 333 is relatively wide in the lateral direction and is interconnected at one end to the body 316 and at its second end to the central section 335, the legs are relatively stiff. Further, because of the stiffness of the legs 333 and because the legs are blanked from the body 316 and undergo very little, if any, horizontal movement during manufacturing, an edge 334 of each leg 333 facing the longitudinal centerline 325 may function as a highly accurate lateral datum for laterally positioning the first optical component 150.

The central retention section 335 includes a generally rectangular retention or holddown section 336 that is connected to each leg 333 by a relatively narrow (in the lateral direction of the body 316) web or strap 337. For example, webs 337 may be laterally narrower than the legs 333. The central retention section 335 is wider than the legs 333 and is configured so that the inner portion 338 of the central retention section extends closer to the longitudinal centerline 325 of the body 316 than the edges 334 of each leg. As a result, the inner portion 338 of the central retention section 335 will extend over the upper surface 156 of the first optical component 150 when the first side edge 153 of the first optical component is pressed against the edges 334 of the legs 333 of the holddown and datum members 331.

The holddown and datum members 331 are configured so that the distance from the first surface 317 of the body 316 to the lower surface 339 (as depicted in FIG. 17) of the rectangular holddown section 336 is slightly less than the thickness of the first optical component 150. By configuring the webs 337 with a relatively narrow transverse dimension to provide flexibility, the rectangular holddown sections 336 can move or rotate to accommodate the insertion of the first optical component 150 and engage the upper surface 156 of the first optical component 150 and bias the component downward (as depicted in FIG. 17) against the first surface 317 of the body 316.

The holddown and biasing members 340 are generally L-shaped and integrally formed from the body 316. As such, the body 316 includes an opening 341 aligned with each holddown and biasing member 340. Each holddown and biasing member 340 includes a leg 342 and a retention section 346 that extends from the leg. The leg 342 include a first section 343 interconnected to and extending in the plane of the body 316 and a second section 344 extending vertically from the first section. Due to the resiliency of the first section 343 of the legs 342, an edge 345 (FIGS. 18-19) of the second section 344 of each leg 342 facing the longitudinal centerline 325 may function as a biasing member by engaging the second side edge 154 of the first optical component 150 and biasing or forcing the first side edge 153 of the first optical component against the edge 334 of the legs 333 of the holddown and datum members 331, which act as a transverse or lateral datum for the first optical component.

A generally rectangular retention or holddown section 346 extends in a cantilevered manner from the second section 344 of the leg 342 by a relatively narrow (in the lateral direction of the body 316) web or strap 347. The cantilevered holddown section 346 is wider than the first and second sections 343, 344 of the leg 342 and is configured so that the inner portion 348 of the retention section extends closer to the longitudinal centerline 325 of the body 316 than the edge 345 of the second section 344 of each leg 342. As a result, the inner portion 348 of the cantilevered holddown section 346 will extend over the upper surface 156 of the first optical component 150 when the second side edge 154 of the first optical component engages the edges 345 of the second section 344 of the legs 342.

The cantilevered holddown section 346 of each holddown and biasing member 340 is otherwise configured and operates in a manner similar to the rectangular holddown sections 336 of the holddown and datum members 331 except that the cantilevered holddown section 346 is secured to only one leg 342 as compared to the pair of legs 333 of the rectangular holddown section 336.

A holddown and datum member 331 and a holddown and biasing member 340 may be aligned along but positioned on opposite sides of the longitudinal centerline 325 of the body 316. Accordingly, a rectangular holddown section 336 of one of the holddown and datum members 331 may be aligned with the cantilevered holddown section 346 of one of the holddown and biasing members 340. The support and reflector member 315 is configured so that the distance between pairs of aligned rectangular holddown sections 336 and cantilevered holddown sections 346 is less than the width of the first optical component 150. As a result, the space between the first surface 317 of the body 316 and the rectangular holddown sections 336 and the space between the first surface of the body and the cantilevered holddown sections 346 define a receptacle or opening 349 into which the first optical component 150 is inserted.

The central section 350 of the body 316 is positioned generally adjacent the lateral centerline 326 of the body and includes a reflector section 351 and a longitudinal stop section 355. The reflector section 351 includes a cantilevered arm 352 that extends out of the plane of the body 316 away from first surface 317 (i.e., upward as depicted in FIGS. 17-18). In addition to its optical properties, the reflector section 351 may also operate as a stop surface or longitudinal datum that limits the longitudinal insertion depth of the first optical component 150 as it is inserted into the receptacle 349 defined by the holddown and datum members 331 and the holddown and biasing members 340.

In the depicted embodiment, the cantilevered arm 352 extends upward from the body 316 and towards the first end 320 of the body and away from the second optical component 160 at an angle of 45°. The cantilevered arm 352 includes a reflector surface 353 aligned with the waveguides 151 of the first optical component 150. The reflector surface 353 is operative to reflect light traveling along the waveguides 151 towards the optical coupling elements 168 of the second optical component 160 or from the optical coupling elements 168 towards the waveguides 151.

The reflector surface 353 may include a plurality of spaced apart optical reflectors 354 with each optical reflector intersecting or aligned with the axis of one of the waveguides 151. In one configuration, the reflector surface 353 and/or the optical reflectors 354 may be configured to reflect light at a 45° angle relative to the waveguides 151 and the body 316. In other configurations, the reflector surface 353 and/or the optical reflectors 354 may be configured to reflect light at a different angle. The optical reflectors 354 may be formed as concave indentations or recesses within the reflector section 351 as described above relative to the support and reflector member 15 and various options and features thereof are not repeated herein.

Referring to FIGS. 20-24, the second component alignment and retention section 360 is generally operatively positioned along the second surface 318 so that the second optical component 160 may be aligned and retained along the second surface. A pair of spaced apart datum members 361 are laterally positioned between the first sidewall 322 and the longitudinal centerline 325 of the body 316 and longitudinally positioned between the second end 321 and the transverse or lateral centerline 326 of the body. A pair of biasing members 370 are laterally positioned between the second sidewall 323 and the longitudinal centerline 325 of the body 316 and longitudinally positioned between the second end 321 and the lateral centerline 326 of the body.

Each datum member 361 is configured as a generally U-shape or bump (in a vertical direction of the body) and is integrally formed from the body 316. As such, the body 316 includes an opening 362 aligned with each datum member 361. Because the datum member 361 is blanked from the body 316 and undergoes very little, if any, horizontal movement during manufacturing, a vertical surface or edge 363 (FIGS. 23-24) of the datum member 361 facing the longitudinal centerline 325 may function as a highly accurate lateral datum for positioning the second optical component 160.

The biasing members 370 are generally L-shaped and integrally formed from the body 316. As such, the body 316 includes an opening 371 aligned with each biasing member 370. Each biasing member 370 includes a cantilevered leg 372 having a first section 373, a second section 374, and a third section 375. The first section 373 is interconnected to and extends along the plane of the body 316, the second section 374 extends vertically from the first section, and the third section 375 extends from and is bent along a vertical edge of the second section. The third section 375 thus defines an engagement surface generally parallel to the longitudinal centerline 325 of the body 316 for contacting the second side edge 164 of the second optical component. Due to the resiliency of the first section 373, the third section 375 or engagement surface, which faces the longitudinal centerline 325, may function as a biasing member to bias or force the first side edge 163 of the second optical component 160 against the edge 363 of the datum members 361 that act as a transverse or lateral datum for the second optical component.

Figure 15:
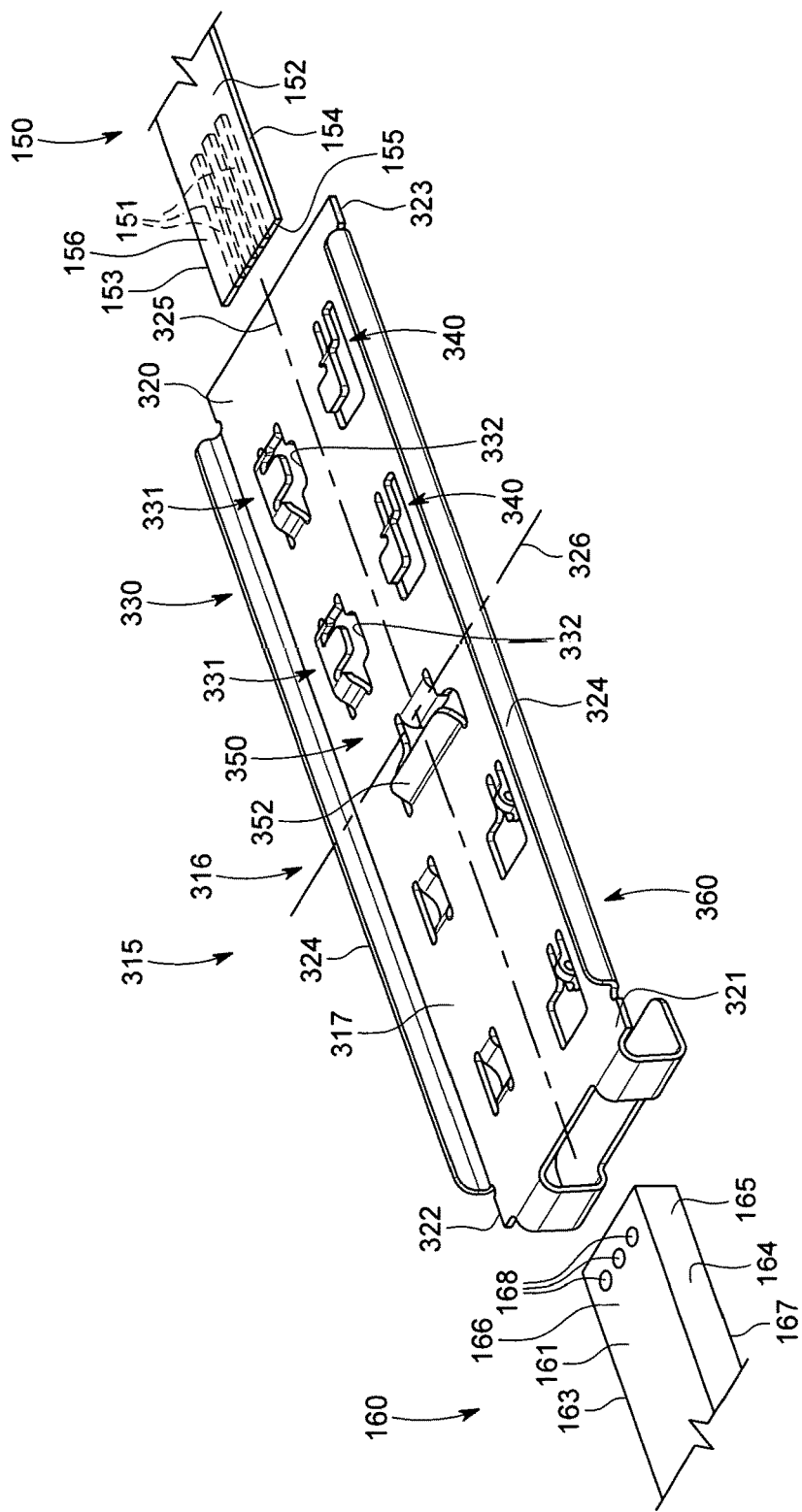
FIG. 15 is an exploded perspective view of the optical system of FIG. 14.
Figure 16:
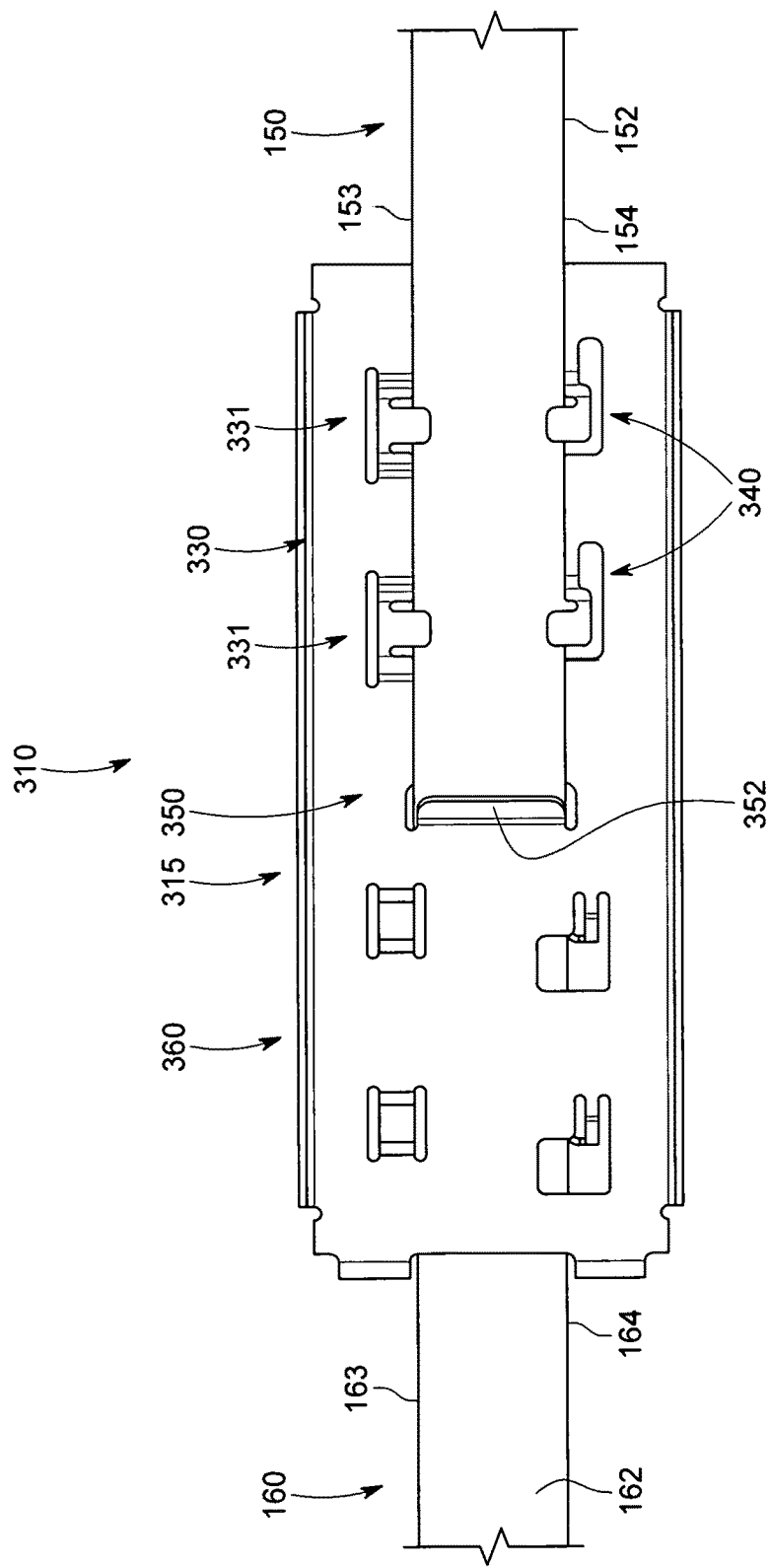
FIG. 16 is a top plan view of the optical system of FIG. 14.

The second component alignment and retention section 360 further includes a retention or holddown member 380 that is separate or distinct from the datum members 361 and the biasing members 370. The holddown member 380 includes a pair of spaced apart legs 381 that extend generally vertically from the second end 321 of the body 316. An arm 382 extends in a cantilevered manner from the legs 381 generally parallel to the plane of the body 316 and towards the center section 350. An engagement section 383 at the end of the arm 382 is configured to engage the lower surface 167 (as depicted in FIG. 15) of second optical component 160.

The holddown member 380 is configured so that the distance from the second surface 318 of the body 316 to the engagement section 383 is less than the vertical thickness of the second optical component 160. The resilient nature of the legs 381 and the arm 382 can accommodate the insertion of the second optical component 160 and bias the second optical component against the second surface 318 of the body 316.

Figure 22:
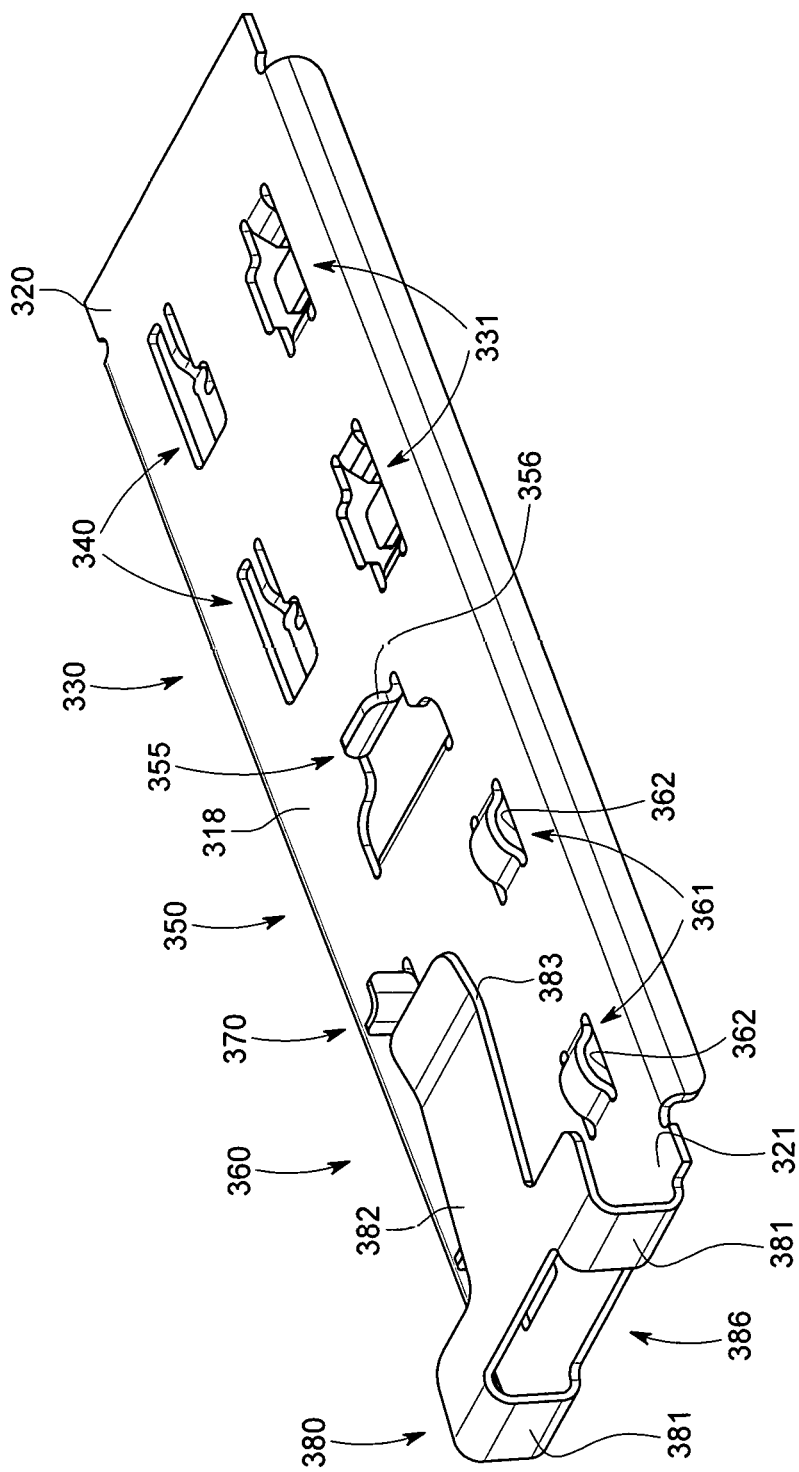
FIG. 22 is perspective view of the waveguide support and reflector member taken from the perspective of FIG. 20.
Figure 23:
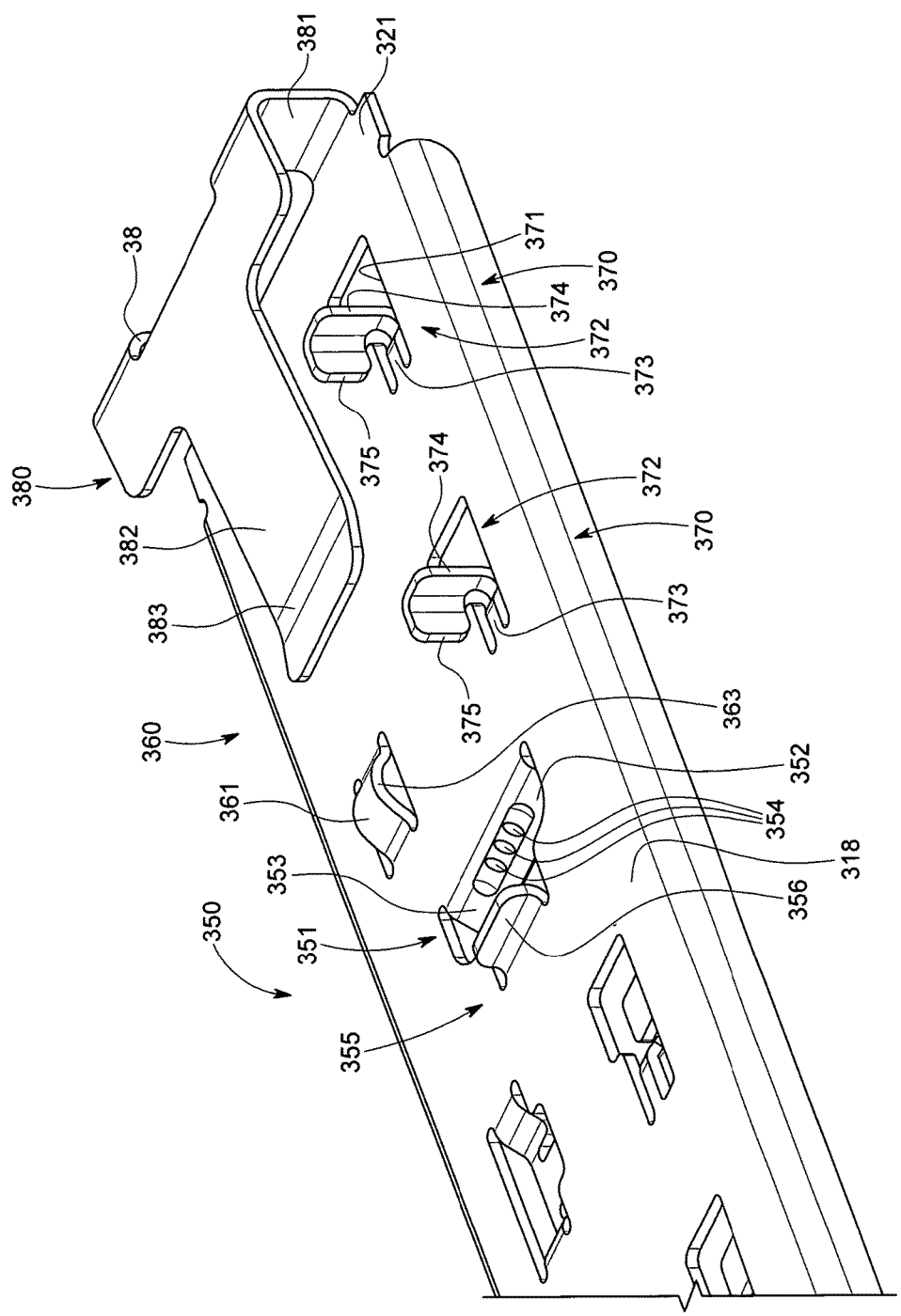
FIG. 23 is an enlarged fragmented view of the waveguide support and reflector member of FIG. 22 but rotated by 180°.
Figure 24:
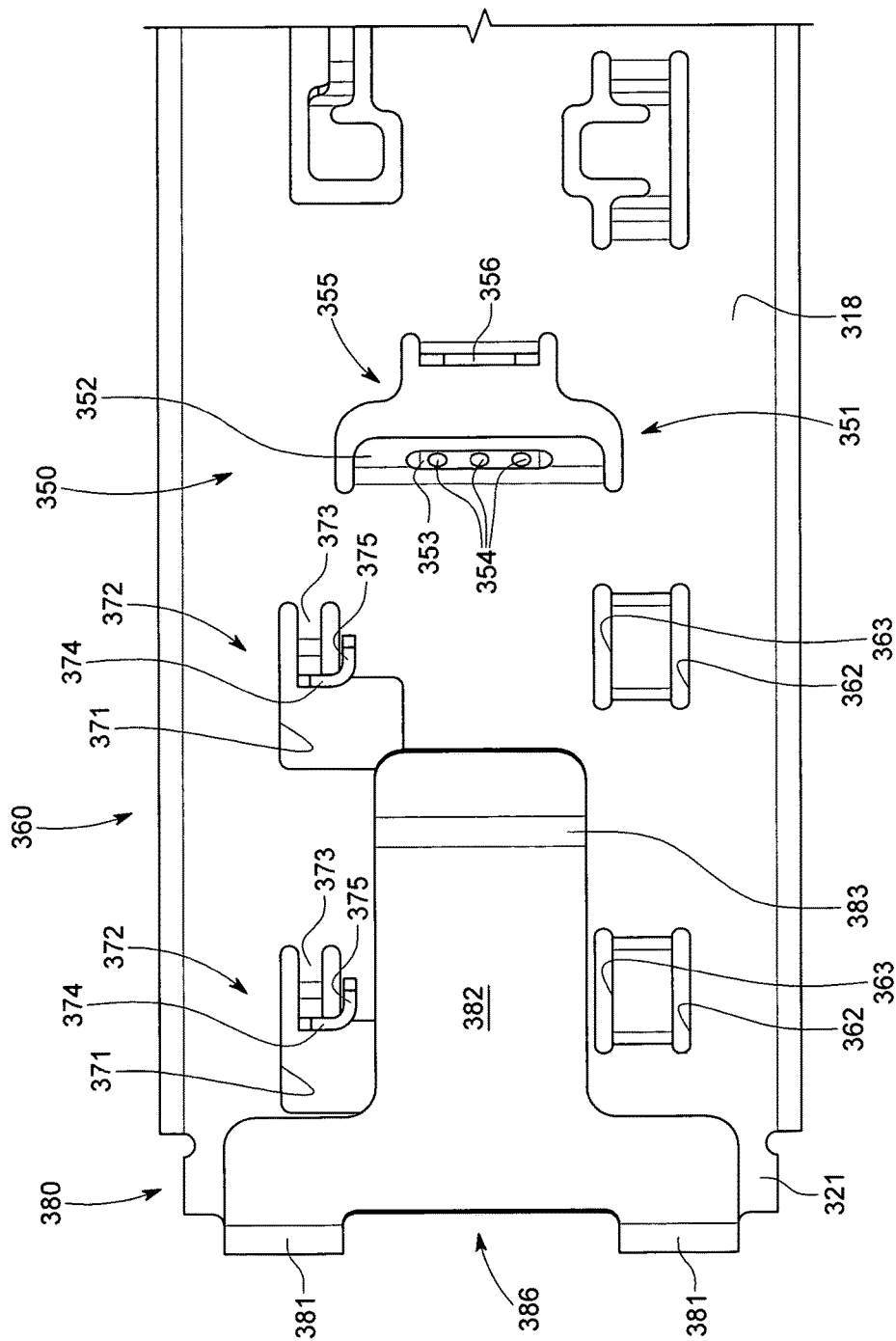
FIG. 24 is an enlarged fragmented top plan view of the waveguide support and reflector member of FIG. 23.
Figure 25:
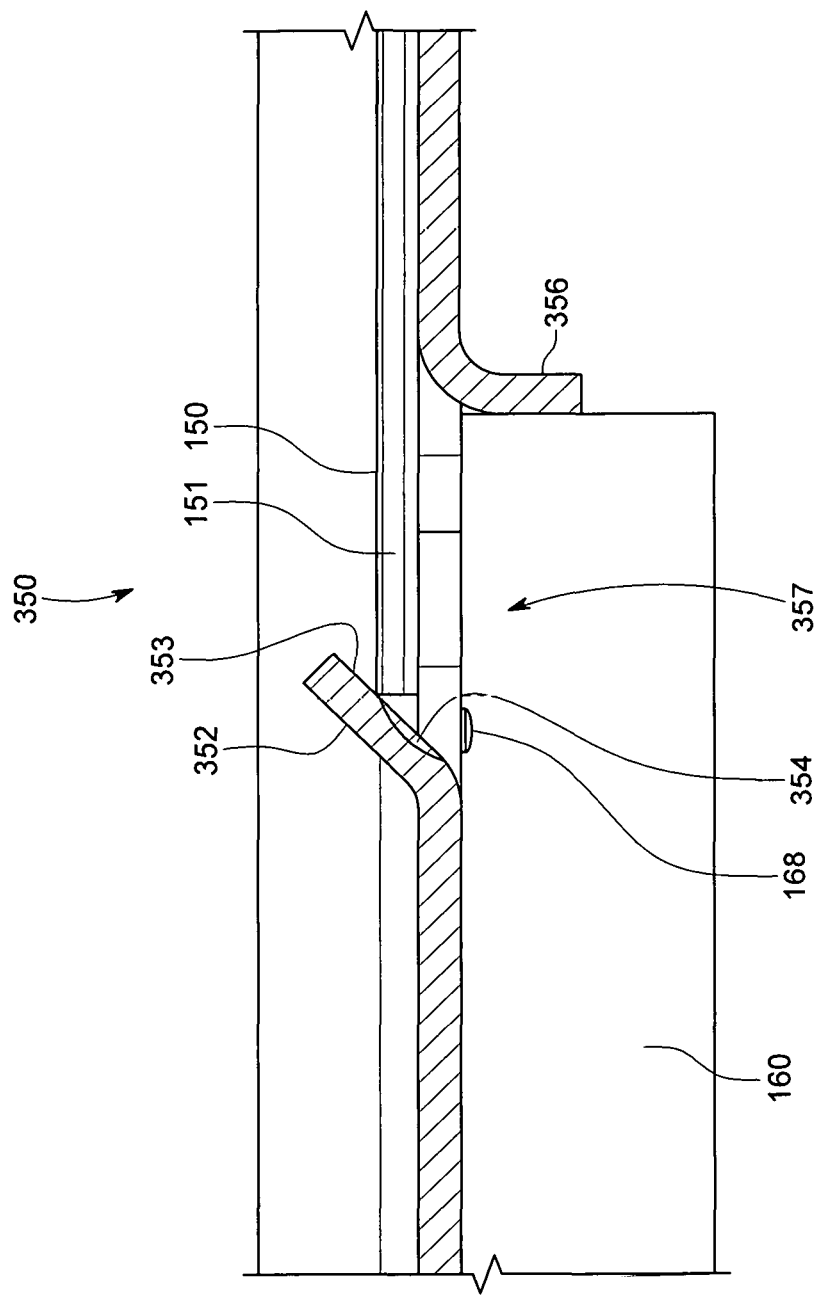
FIG. 25 is an enlarged sectional view of the central section of the optical system of FIG. 14 taken along the longitudinal centerline.

The opening 385 between the spaced apart legs 381, the datum members 361, the biasing members 370, and the holddown member 380 define a receptacle or opening 386 into which the second optical component 160 is inserted. The longitudinal stop section 355 of the central section 350 includes a cantilevered arm 356 that extends out of the plane of the body 316 and away from the second surface 318 (upward as depicted in FIG. 22). The longitudinal stop section 355 operates as a stop surface or longitudinal datum that limits the longitudinal insertion depth of the second optical component 160 as it is inserted into the receptacle 386 defined by the opening 385 between the spaced apart legs 381, the datum members 361, the biasing members 370, and the holddown member 380.

Although the holddown and datum members 331 and the holddown and biasing members 340 are each dual function components (e.g., holddown and datum or holddown and biasing), the waveguide alignment and retention section 330 may include single function components such as those depicted at the second component alignment and retention section 360. Similarly, the second component alignment and retention section 360 may be configured with dual function components such as those depicted at the waveguide alignment and retention section 330.

The waveguide support and reflector member 315 may be formed in any desired manner and from any desired material. In one embodiment, the waveguide support and reflector member 315 may be formed of resilient sheet-metal material. The sheet metal may be reflective such as copper, a copper alloy (e.g., beryllium copper), aluminum or some other desired material. In some embodiments, forming the waveguide support and reflector member 315 of beryllium copper may be particularly desirable based upon the reflectivity or reflectance of such material with respect to certain wavelengths that may be reflected by the waveguide support and reflector member. If the sheet metal is not sufficiently reflective, a reflective material (e.g., gold, silver, nickel, platinum, or alloys of such materials) may be plated or otherwise applied to the reflector surface 353 and/or the optical reflectors 354. The waveguide support and reflector member 315 may be unitarily formed as a one-piece member or may be formed from multiple components that are secured together.

After forming the waveguide support and reflector member 315, the first optical component 150 and the second optical component 160 may be mounted on the waveguide support and reflector member. To do so, the mating end 155 of the first optical component 150 is slid between the holddown and datum members 331 and the holddown and biasing members 340 and towards the reflector section 351. While doing so, the upper surface 156 of the first optical component 150 is positioned beneath the rectangular holddown section 336 of the holddown and datum members 331 and the cantilevered holddown section 346 of the holddown and biasing members 340. The second side edge 154 of the first optical component 150 engages the edges 345 of the legs 342 of the holddown and biasing members 340 to bias the first side edge 153 of the first optical component against the edges 334 of the legs 333 of the holddown and datum members 331 to accurately laterally position the first optical component.

Longitudinal positioning of the first optical component 150 may be achieved by inserting the first component until reaching and engaging the reflector section 351. In an alternate embodiment, a stop member separate from the reflector section 351 may be used to limit the insertion depth of the first optical component 150.

The mating end 165 of the second optical component 160 is slid through the opening 385 between the spaced apart legs 381 and between the datum members 361 and the biasing members 370 and towards the stop section 355. While doing so, the lower surface 167 of the second optical component 160 is positioned beneath and engages the engagement section 382 of the holddown member 380. The second side edge 164 of the second optical component 160 engages the engagement surfaces 375 of the biasing members 370 to bias the first side edge 163 of the second optical component against the edges 363 of the datum members 361 to accurately laterally position the second optical component. Longitudinal positioning of the second optical component 160 may be achieved by inserting the second component until reaching and engaging the stop section 355 of the central section 350.

Through such a configuration, passive longitudinal and lateral alignment of the first and second optical components 150, 160 may be achieved. In an alternate embodiment, the support and reflector member 315 may be modified to permit active alignment when positioning the first and second optical components 150, 160 in either or both of the longitudinal and lateral directions. For example, eliminating the stop section 355 from the support and reflector member 315 would permit passive lateral alignment and active longitudinal alignment.

Upon aligning the first optical component 150 and the second optical component 160, the optical components may be secured to the support and reflector member 315 in any of the manners described above with respect to the support and reflector member 15. Optical signals in the form of light may then pass between the waveguides 151 of the first optical component 150 and the optical coupling elements 168 by reflecting off of the reflector surface 353. In doing so, light will pass through the opening 357 (FIG. 25) in the central section 350 of the body 316 adjacent the reflector surface 353 and the cantilevered arm 356 of the longitudinal stop surface 355.

Figure 26:
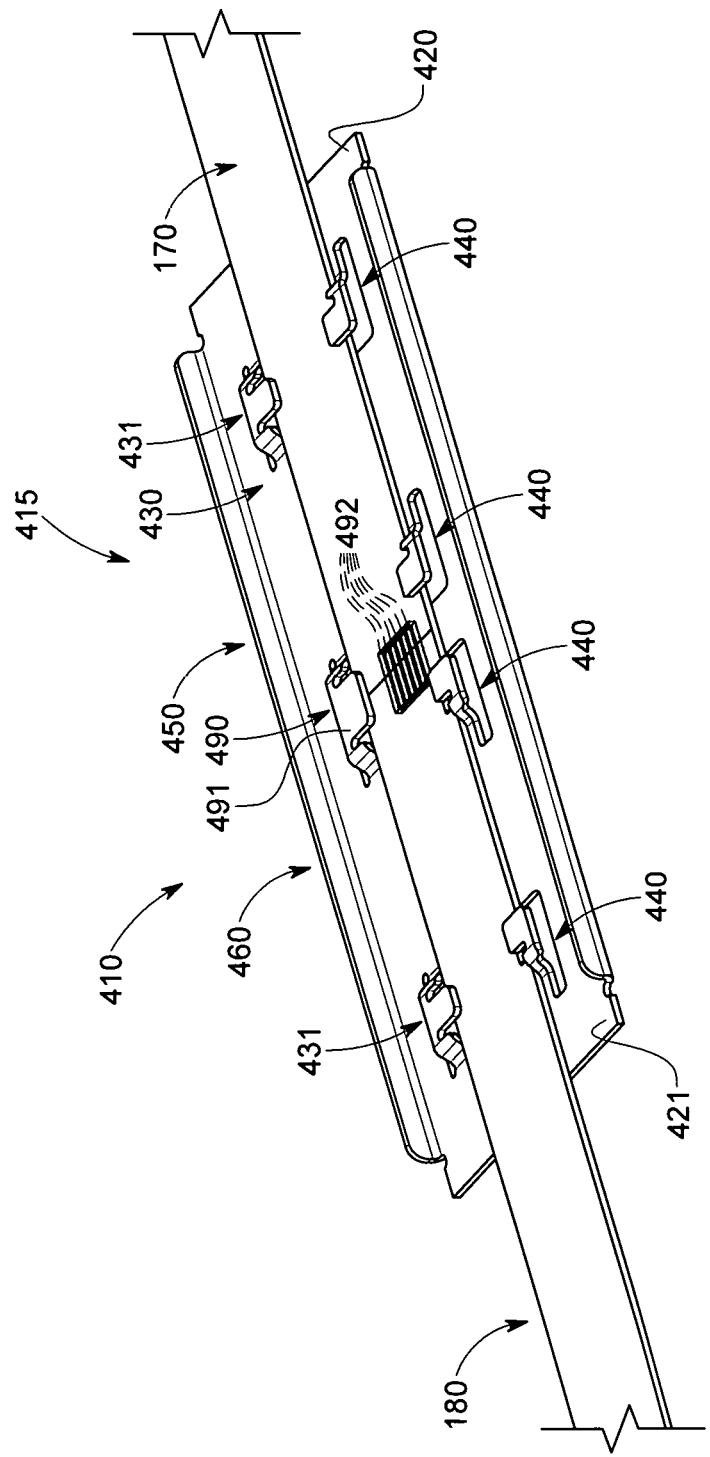
FIG. 26 is a perspective view of another alternate embodiment of an optical system.
Figure 27:
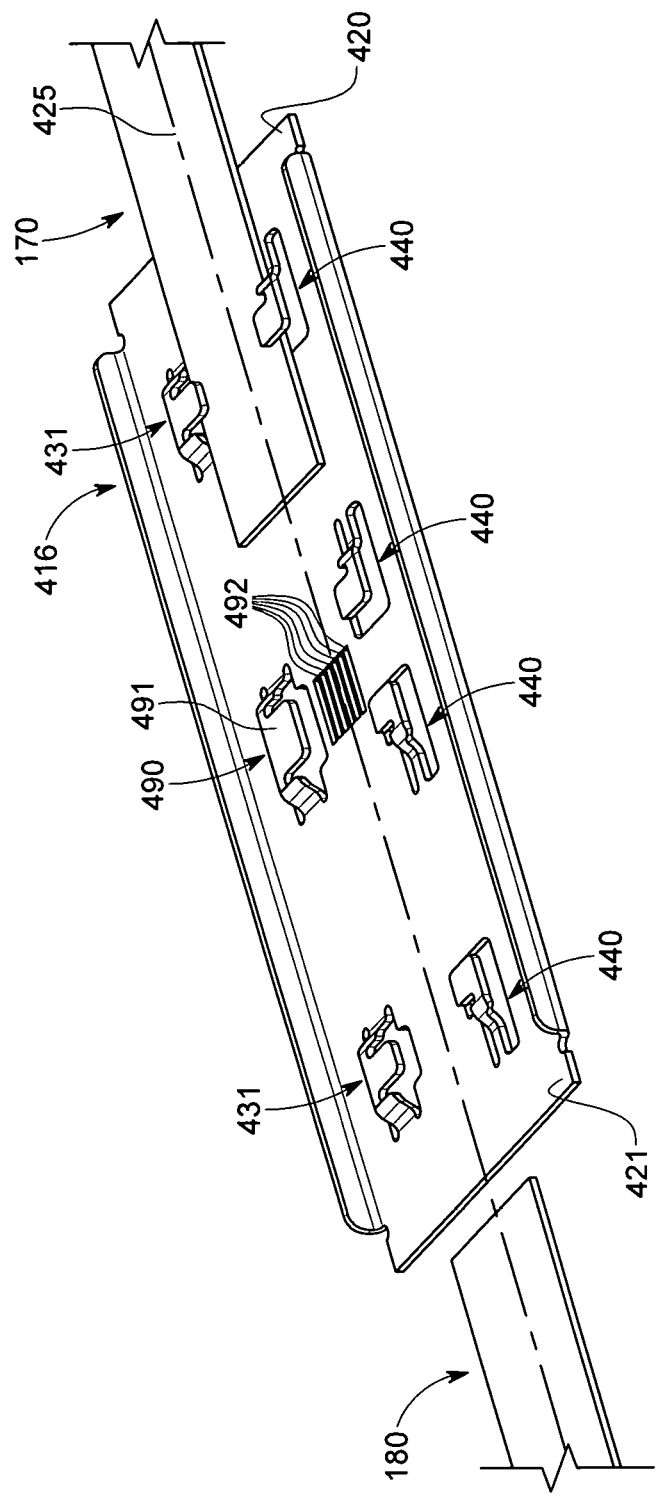
FIG. 27 is an enlarged partially exploded view of the optical system of FIG. 26.

Referring to FIGS. 26-27, another alternate embodiment of an optical system 410 is depicted. Optical system 410 includes an in-line waveguide support and alignment member 415 that supports and aligns a first optical component 150 and a second optical component 170. Each of the first and second optical components 170, 180 may be similar to the first optical component 150 described above in certain features and components of the first and second optical components 170, 180 are not further described herein.

The first and second optical components 170, 180 do not need to be identical. For example, the first optical component 170 may comprise a polymer waveguide and the second optical component 180 may comprise an array of optical fibers. Regardless of the configuration of the first and second optical components 170, 180, the in-line waveguide support and alignment member 415 is operative to support and align an optical channel within the first optical component with an optical channel within the second optical component.

The in-line waveguide support and alignment member 415 is similar to the waveguide support and reflector member 315 and certain features and components thereof are not further described herein for purposes of brevity. The member 415 includes a first component or waveguide alignment and retention section 430, a central section 450, and a second component or waveguide alignment and retention section 460.

The first component or waveguide alignment and retention section 430 and is generally similar to the waveguide alignment and retention section 330 described above. More specifically, section 430 includes a first hold down and datum member 431 generally adjacent the first end 420 of the body 416 on a first side of the longitudinal centerline 425 of the body.

The section 430 further includes a pair of holddown and biasing members 440 on a second side of the longitudinal centerline 425 of the body 416. One of the holddown and biasing members 440 is positioned adjacent the first end 420 of the body 416 while the second holddown and biasing member is positioned adjacent the central section 450 of the body 416. The holddown and biasing members 440 may be substantially identical to the holddown and biasing members 340 described above.

The second component or waveguide alignment and retention section 460 and is generally similar to the first waveguide alignment and retention section 430 described above. More specifically, section 460 includes a first hold down and datum member 431 generally adjacent the second end 421 of the body 416 on the first side of the longitudinal centerline 425 of the body. The section 460 further includes a pair of holddown and biasing members 440 on the second side of the longitudinal centerline 425 of the body 416. One of the holddown and biasing members 440 is positioned adjacent the second end 421 of the body 416 while the second holddown and biasing member is positioned adjacent the central section 450 of the body 416.

The central section 450 of the body 416 operates as a termination section for the in-line waveguide support and alignment member 415. The central section 450 of the body 416 includes a holddown and datum member 490 disposed in-line with the first holddown and datum members 431 along the first side of the longitudinal centerline 425. The second holddown and datum member 490 may be substantially identical to the first holddown and datum members 431. In some instances, the central retention section 491 of the second holddown and datum member 490 may be wider longitudinally relative to body 416 to engage and hold down both of the first and second optical components 170, 180.

The central section 450 of the body 416 may include one or more surface interruptions 492 to increase the adhesive properties at the central section. In one embodiment, the surface interruptions may be a plurality of longitudinal slots into which an adhesive may flow while securing the first and second optical components 170, 180 to the body 416.

During assembly, the first optical component 170 may be slid from the first end 420 of the body 416 between the holddown and datum member 431 and the holddown and biasing members 440 until reaching the holddown and datum member 490 at the central section 450. Similarly, the second optical component 180 may be slid from the second end 421 of the body 416 between the holddown and datum member 431 and the holddown and biasing members 440 until reaching the holddown and datum member 490 at the central section 450. The biasing function of the holddown and biasing members 440 will force or bias both of the first and second optical components 170, 180 against the holddown and datum members 431, 490 to laterally align the optical waveguides within the first and second optical components. Each of the holddown and datum members 431, 490 and the holddown and biasing members 440 will force the first and second optical components downward onto the upper surface 417 of the body 416. Upon aligning and positioning the first and second optical components 170, 180 in an abutting relationship at the central section 450 of the body 416, the first and second optical components may be secured together and/or to the in-line waveguide support and alignment member 415 as described above.

Although depicted with the holddown and datum members 331 and the holddown and biasing members 340 on the body 316 and the holddown and datum members 431, 490 and the holddown and biasing members 440 on the body 416, the datum and biasing functionality and/or the holddown functionality of the waveguide support and reflector member 315 and the in-line waveguide support and alignment member 415 may be provided on an assembly fixture rather than on the members 315, 415, if desired.

Further, although depicted with the lateral datum for each of the optical components 150, 160, 170, 180 being aligned along the same side of the longitudinal centerline 425, the positioning of the lateral datum for each optical component may be independent. More specifically, the lateral datum for each optical component is dependent upon the lateral position of the waveguides or optical channels within the optical components as well as the position of the edge surface of the optical component that contacts the datum. Accordingly, the lateral datum for each optical component 150, 160, 170, 180 may be positioned on either side of the longitudinal centerline and may or may not be aligned with the lateral datum of the optical component to which it is optically connected.

It will be appreciated that the foregoing description provides examples of the disclosed system and technique. However, it is contemplated that other implementations of the disclosure may differ in detail from the foregoing examples. For example, although the embodiments are depicted with a plurality of optical waveguides and other optical components, the concepts described herein are applicable to embodiments including only a single optical waveguide. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. Still further, the advantages described herein may not be applicable to all embodiments encompassed by the claims.

The invention claimed is:

1. A waveguide support and reflector member for optically connecting a first optical component including at least one optical waveguide with a second optical component, each optical waveguide having an optical axis, the waveguide support and reflector member comprising:
   a body having a waveguide retention section and a reflector section;
   the waveguide retention section being configured to support a portion of the first optical component, the waveguide retention section defining an optical plane along which each optical waveguide is disposed upon positioning the optical component at the waveguide retention section;
   the waveguide retention section further comprises a first optical component lateral alignment datum configured to laterally position the first optical component, wherein the first optical component lateral alignment datum is disposed on a first side of a longitudinal centerline of the body and the waveguide retention section further comprises at least one biasing member on a second, opposite side of the longitudinal centerline of the body, the biasing member being configured to bias the optical component towards the first optical component lateral alignment datum; and
   the reflector section having an optical reflector surface intersecting with the optical plane, the reflector section being configured to optically connect the at least one optical waveguide with the second optical component.

2. The waveguide support and reflector member of claim 1, wherein the body is formed as a generally planar unitary component.

3. The waveguide support and reflector member of claim 2, wherein the reflector section extends at an angle to the generally planar body.

4. The waveguide support and reflector member of claim 2, wherein the body is formed of a sheet metal material.

5. A waveguide support and reflector member for optically connecting a first optical component including at least one optical waveguide with a second optical component, each optical waveguide having an optical axis, the waveguide support and reflector member comprising:
   a body having a waveguide retention section and a reflector section;
   the waveguide retention section being configured to support a portion of the first optical component, the waveguide retention section defining an optical plane along which each optical waveguide is disposed upon positioning the optical component at the waveguide retention section, the waveguide retention section further comprises a first optical component lateral alignment datum configured to laterally position the first optical component;
   the waveguide retention section comprises at least one holddown and datum member on a first side of a longitudinal centerline of the body and at least one holddown and biasing member on a second, opposite side of the longitudinal centerline of the body, wherein the holddown and datum member includes the first optical component lateral alignment datum and a resilient retention member configured to bias the first optical component toward the body and the holddown and biasing member includes a biasing member to bias the optical component towards the first optical component lateral alignment datum and a resilient retention member configured to bias the first optical component towards the body; and the reflector section having an optical reflector surface intersecting with the optical plane, the reflector section being configured to optically connect the at least one optical waveguide with the second optical component.

6. A waveguide support and reflector member for optically connecting a first optical component including at least one optical waveguide with a second optical component, each optical waveguide having an optical axis, the waveguide support and reflector member comprising:

a body having a waveguide retention section and a reflector section;

the waveguide retention section being configured to support a portion of the first optical component, the waveguide retention section defining an optical plane along which each optical waveguide is disposed upon positioning the optical component at the waveguide retention section;

the reflector section having an optical reflector surface intersecting with the optical plane, the reflector section being configured to optically connect the at least one optical waveguide with the second optical component wherein the body further includes a second component retention section configured to support the second optical component, the second component retention section being optically aligned with the optical reflector surface along a second optical path between the optical reflector surface and the second component retention section;

the second component retention section further comprises a second optical component lateral alignment datum configured to laterally position the second optical component relative to the first optical component lateral alignment datum; and the second component retention section comprises at least one datum member on a first side of a longitudinal centerline of the body and at least one biasing member on a second, opposite side of the longitudinal centerline of the body, wherein the at least one datum member includes the second optical component lateral alignment datum and the at least one biasing member includes a biasing member to bias the second optical component towards the second optical component lateral alignment datum.

7. The waveguide support and reflector member of claim 6, wherein the second component retention section comprises a receptacle spaced from the reflector section.

8. The waveguide support and reflector member of claim 6, wherein the body includes at least one opening adjacent the reflector, the second optical path between the optical reflector surface and the second component retention section extending through the at least one opening.

9. The waveguide support and reflector member of claim 6, further comprising a holddown section for biasing the second optical component towards the body.

10. The waveguide support and reflector member of claim 1, wherein the waveguide retention section includes a receptacle configured to receive the at least one waveguide therein.

11. The waveguide support and reflector member of claim 1, wherein the optical reflector surface includes a plurality of spaced apart optical reflectors.

12. The waveguide support and reflector member of claim 11, wherein each optical reflector comprises a concave recess.

* * * * *